(12) United States Patent  
Sasaki et al.

(10) Patent No.: US 8,792,207 B1
(45) Date of Patent: Jul. 29, 2014

(54) MAGNETIC HEAD FOR PERPENDICULAR MAGNETIC RECORDING HAVING A RETURN PATH SECTION

(71) Applicants: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/861,033

(22) Filed: Apr. 11, 2013

(51) Int. Cl.
*G11B 5/147* (2006.01)
*G11B 5/187* (2006.01)

(52) U.S. Cl.
USPC .................................. 360/123.06; 360/125.13

(58) Field of Classification Search
CPC .... G11B 5/1278; G11B 5/315; G11B 5/3116; G11B 5/3123; G11B 5/3146; G11B 5/1475; G11B 5/17
See application file for complete search history.

(56) References Cited

U.S. PATENT DOCUMENTS

| | | | |
|---|---|---|---|
| 6,954,340 B2 | 10/2005 | Shukh et al. | |
| 7,126,788 B1 * | 10/2006 | Liu et al. | 360/125.53 |
| 7,843,665 B2 * | 11/2010 | Sasaki et al. | 360/125.03 |
| 8,173,028 B2 * | 5/2012 | Ishizaki et al. | 216/22 |
| 8,218,264 B1 * | 7/2012 | Sasaki et al. | 360/125.16 |
| 8,310,787 B1 * | 11/2012 | Sasaki et al. | 360/125.3 |
| 8,363,346 B2 * | 1/2013 | Taguchi | 360/75 |
| 8,416,528 B1 * | 4/2013 | Sasaki et al. | 360/125.02 |
| 8,422,166 B1 * | 4/2013 | Sasaki et al. | 360/123.06 |
| 8,441,755 B2 * | 5/2013 | Sasaki et al. | 360/123.03 |
| 8,498,077 B1 * | 7/2013 | Sasaki et al. | 360/123.06 |
| 8,576,514 B2 * | 11/2013 | Sasaki et al. | 360/125.3 |
| 2007/0274003 A1 * | 11/2007 | Ota et al. | 360/126 |
| 2007/0291409 A1 * | 12/2007 | Sasaki et al. | 360/126 |

* cited by examiner

*Primary Examiner* — Brian Miller
(74) *Attorney, Agent, or Firm* — Oliff PLC

(57) ABSTRACT

A magnetic head includes a coil, a main pole, and a return path section. The return path section includes a coil surrounding portion located on the front side in the direction of travel of a recording medium relative to the main pole and provided for forming a coil receiving space, and a connecting portion connecting the main pole and the coil surrounding portion to each other. The connecting portion has a contact surface in contact with the main pole. The coil receiving space is a space defined by a first virtual plane intersecting the contact surface and parallel to the medium facing surface, a second virtual plane including the contact surface and perpendicular to the direction of travel of the recording medium, and the coil surrounding portion. The coil includes a portion received in the coil receiving space.

11 Claims, 17 Drawing Sheets

MAGNETIC HEAD FOR PERPENDICULAR MAGNETIC RECORDING HAVING A RETURN PATH SECTION

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a return path section.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole allows a magnetic flux corresponding to the magnetic field produced by the coil to pass, and produces a write magnetic field from its end face.

A magnetic head for use in a magnetic disk drive such as a hard disk drive is typically provided in a slider. The slider has the medium facing surface. The medium facing surface has an air inflow end (a leading end) and an air outflow end (a trailing end). The slider is designed to slightly fly over the surface of a recording medium by means of an airflow that comes from the air inflow end into the space between the medium facing surface and the recording medium.

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). To achieve higher recording density, it is necessary to prevent unwanted erasure.

In order to prevent unwanted erasure induced by the skew and achieve higher recording density, it is effective to provide a return path section that has an end face located in the vicinity of the end face of the main pole in the medium facing surface, as disclosed in, for example, U.S. Pat. No. 6,954,340 B2.

The return path section is magnetically connected to a portion of the main pole away from the medium facing surface so that one or more spaces are formed between the return path section and the main pole. A coil is provided to pass through the one or more spaces. The return path section has the function of capturing from the end face of the return path section a magnetic flux that is produced from the end face of the main pole and spreads in directions other than the direction perpendicular to the plane of a recording medium, and thereby preventing the magnetic flux from reaching the recording medium. The return path section further has the function of capturing from the end face of the return path section a magnetic flux that has been produced from the end face of the main pole and has magnetized the recording medium, and allowing the magnetic flux to flow back to the main pole. A magnetic head having such a return path section allows the prevention of unwanted erasure and provides a further improvement in recording density.

In the magnetic head disclosed in U.S. Pat. No. 6,954,340 B2, the end face of the return path section is exposed over a large area in the medium facing surface. In this case, part of the magnetic flux captured into the return path section from a portion of the end face of the return path section located in the vicinity of the end face of the main pole may leak from another portion of the end face of the return path section toward the recording medium. This may result in the occurrence of unwanted erasure.

To avoid the above-described problem, reducing the return path section in dimension in the track width direction, for example, is conceivable. Doing so, however, results in a reduction in the volume of the return path section, and thus makes the return path section prone to flux saturation. As a result, there arises a problem that magnetic flux leaks from the end face of the return path section toward the recording medium to cause unwanted erasure.

OBJECT AND SUMMARY OF THE INVENTION

It is an object of the present invention to provide a magnetic head for perpendicular magnetic recording that is capable of preventing unwanted erasure from occurring due to leakage of magnetic flux toward a recording medium from an end face of a return path section exposed in the medium facing surface.

A magnetic head for perpendicular magnetic recording of the present invention includes a medium facing surface facing a recording medium, a coil producing a magnetic field corresponding to data to be written on the recording medium, a main pole, and a return path section made of a magnetic material. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The return path section includes: a first coil surrounding portion located on a front side in a direction of travel of the recording medium relative to the main pole and provided for forming a first coil receiving space; and a first connecting portion located away from the medium facing surface and connecting the main pole and the first coil surrounding portion to each other. The first coil surrounding portion has a first end face located in the medium facing surface and lying on the front side in the direction of travel of the recording medium relative to the end face of the main pole. The first connecting portion has a contact surface in contact with the main pole.

The first coil receiving space is a space defined by a first virtual plane, a second virtual plane and the first coil surrounding portion, the first virtual plane intersecting the contact surface and being parallel to the medium facing surface, the second virtual plane including the contact surface and being perpendicular to the direction of travel of the recording medium. The coil includes a first portion received in the first coil receiving space. No portion of the coil other than the first portion is present in a region that is located on the front side in the direction of travel of the recording medium relative to the second virtual plane and sandwiched between the first virtual plane and the medium facing surface. The first end face has a width in a track width direction that is smaller than a maximum width of the first coil receiving space in the track width direction.

In the magnetic head for perpendicular magnetic recording of the present invention, the width of the first end face in the track width direction may be in the range of 2 to 10 μm.

In the magnetic head for perpendicular magnetic recording of the present invention, the coil may include a first winding portion wound around the first connecting portion. In this case, the first portion of the coil is part of the first winding portion.

In the magnetic head for perpendicular magnetic recording of the present invention, the return path section may further include a second coil surrounding portion located on a rear side in the direction of travel of the recording medium relative to the main pole and provided for forming a second coil receiving space. The second coil surrounding portion has a second end face located in the medium facing surface and lying on the rear side in the direction of travel of the recording medium relative to the end face of the main pole. The second coil receiving space is a space defined by a third virtual plane, a fourth virtual plane and the second coil surrounding portion, the third virtual plane being parallel to the medium facing surface, the fourth virtual plane being located on the rear side in the direction of travel of the recording medium relative to the main pole and perpendicular to the direction of travel of the recording medium. The coil further includes a second portion received in the second coil receiving space. No portion of the coil other than the second portion is present in a region that is located on the rear side in the direction of travel of the recording medium relative to the fourth virtual plane and sandwiched between the third virtual plane and the medium facing surface. The second end face has a width in the track width direction that is smaller than a maximum width of the second coil receiving space in the track width direction. The third virtual plane may intersect the contact surface.

Where the return path section includes the second coil surrounding portion, the width of each of the first and second end faces in the track width direction may be in the range of 2 to 10 μm. The magnetic head for perpendicular magnetic recording may further include two side shields each made of a magnetic material, the two side shields having two end faces that are located in the medium facing surface and lie on opposite sides of the end face of the main pole in the track width direction.

Where the return path section includes the second coil surrounding portion, the return path section may further include a second connecting portion located away from the medium facing surface and connecting the main pole and the second coil surrounding portion to each other. In this case, the coil may include a second winding portion wound around the second connecting portion. The second portion of the coil is part of the second winding portion.

Where the return path section includes the second coil surrounding portion, the return path section may further include a coupling portion located away from the medium facing surface and coupling the first coil surrounding portion and the second coil surrounding portion to each other without being in contact with the main pole. In this case, the coil may include a second winding portion wound around the coupling portion. In this case, the second portion of the coil is part of the second winding portion.

In the magnetic head for perpendicular magnetic recording of the present invention, the return path section includes the first coil surrounding portion provided for forming the first coil receiving space. The first coil surrounding portion has the first end face located in the medium facing surface and lying on the front side in the direction of travel of the recording medium relative to the end face of the main pole. The width of the first end face in the track width direction is smaller than the maximum width of the first coil receiving space in the track width direction. The present invention thus allows the return path section to be large in volume while allowing the first end face of the return path section to be small in area. Consequently, the present invention makes it possible to prevent unwanted erasure from occurring due to leakage of magnetic flux toward the recording medium from the end face of the return path section exposed in the medium facing surface.

Other and further objects, features and advantages of the present invention will appear more fully from the following description.

DETAILED DESCRIPTION OF THE PREFERRED EMBODIMENTS

First Embodiment

Figure 1:
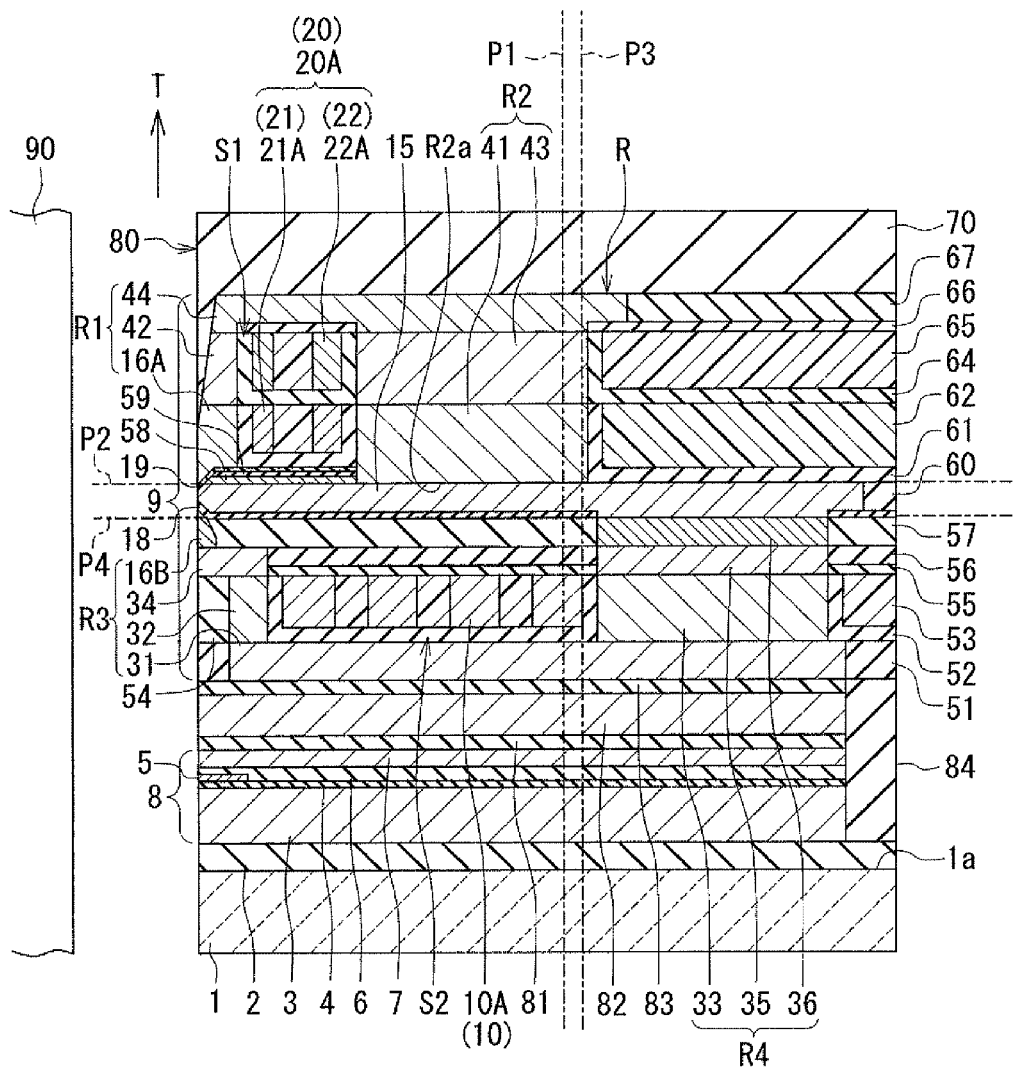
FIG. 1 is a cross-sectional view showing a magnetic head according to a first embodiment of the invention.
Figure 2:
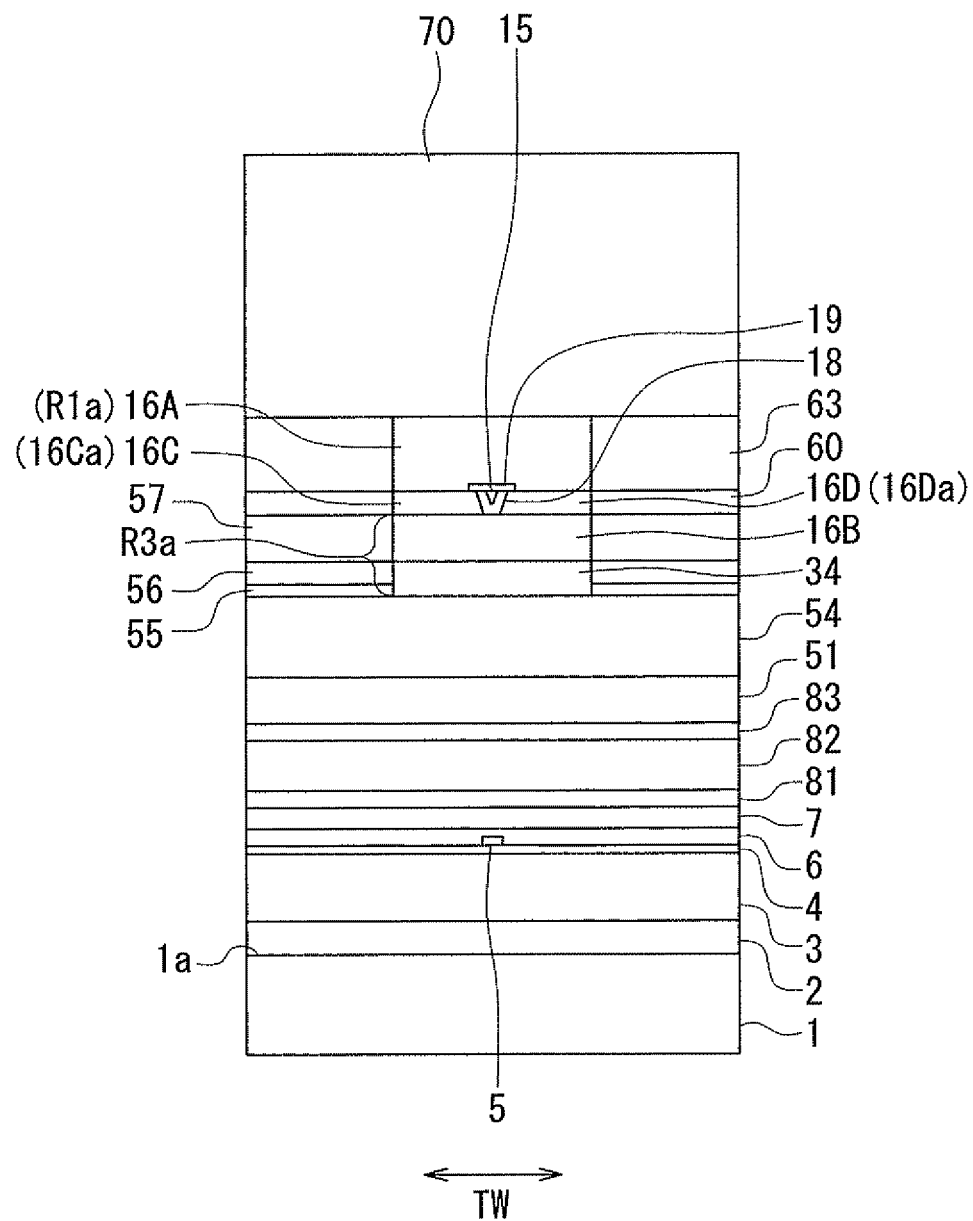
FIG. 2 is a front view showing the medium facing surface of the magnetic head according to the first embodiment of the invention.
Figure 3:
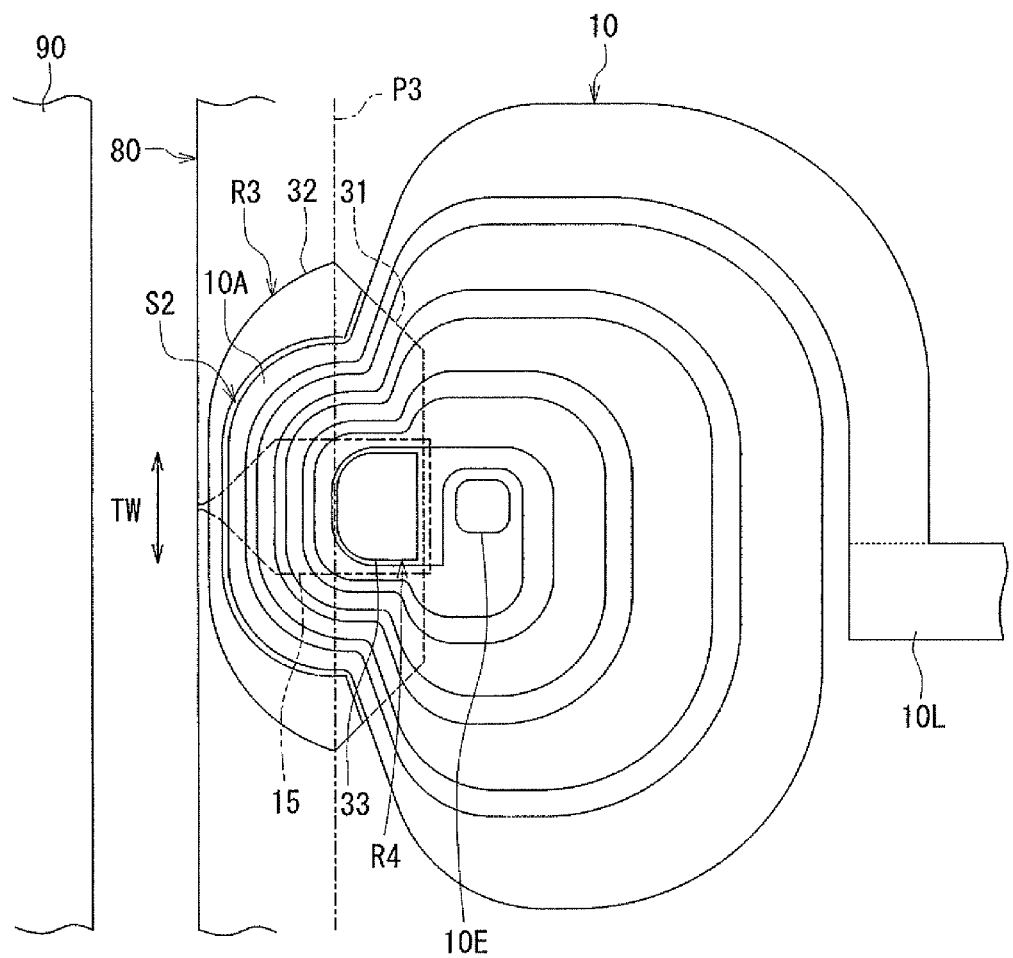
FIG. 3 is a plan view showing a part of a second coil surrounding portion and its periphery in the magnetic head according to the first embodiment of the invention.
Figure 4:
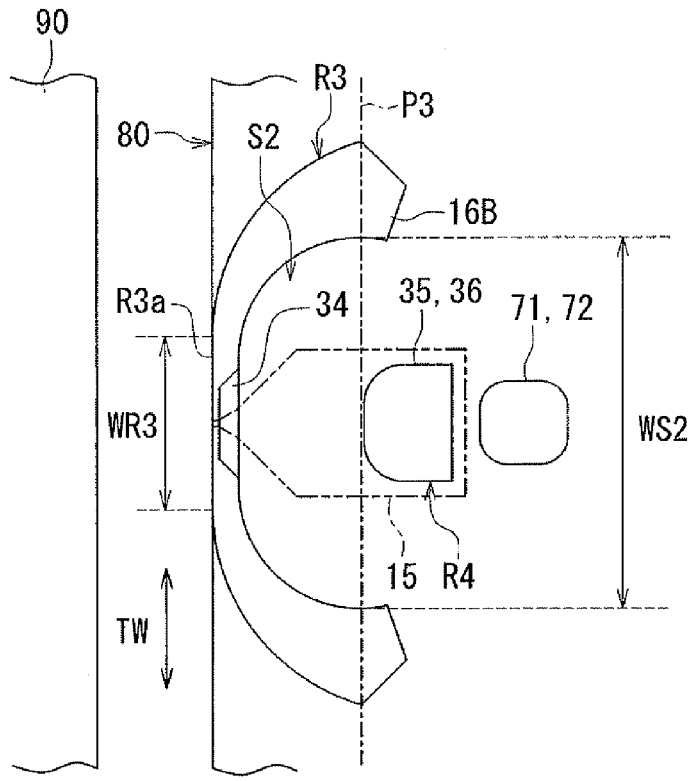
FIG. 4 is a plan view showing another part of the second coil surrounding portion and its periphery in the magnetic head according to the first embodiment of the invention.
Figure 5:
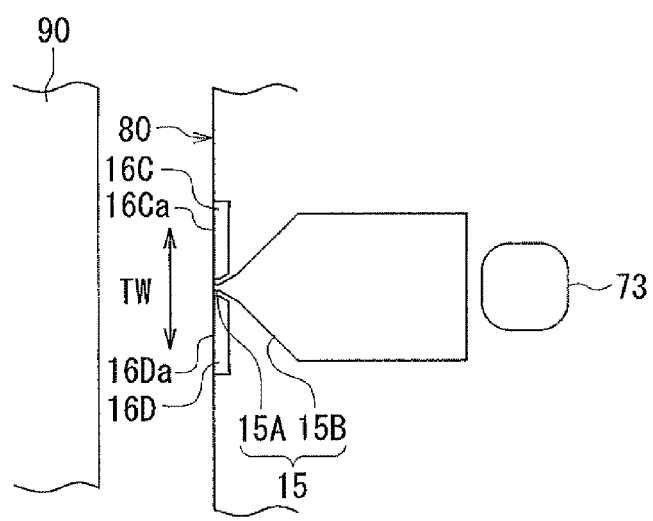
FIG. 5 is a plan view showing a main pole and two side shields of the magnetic head according to the first embodiment of the invention.
Figure 6:
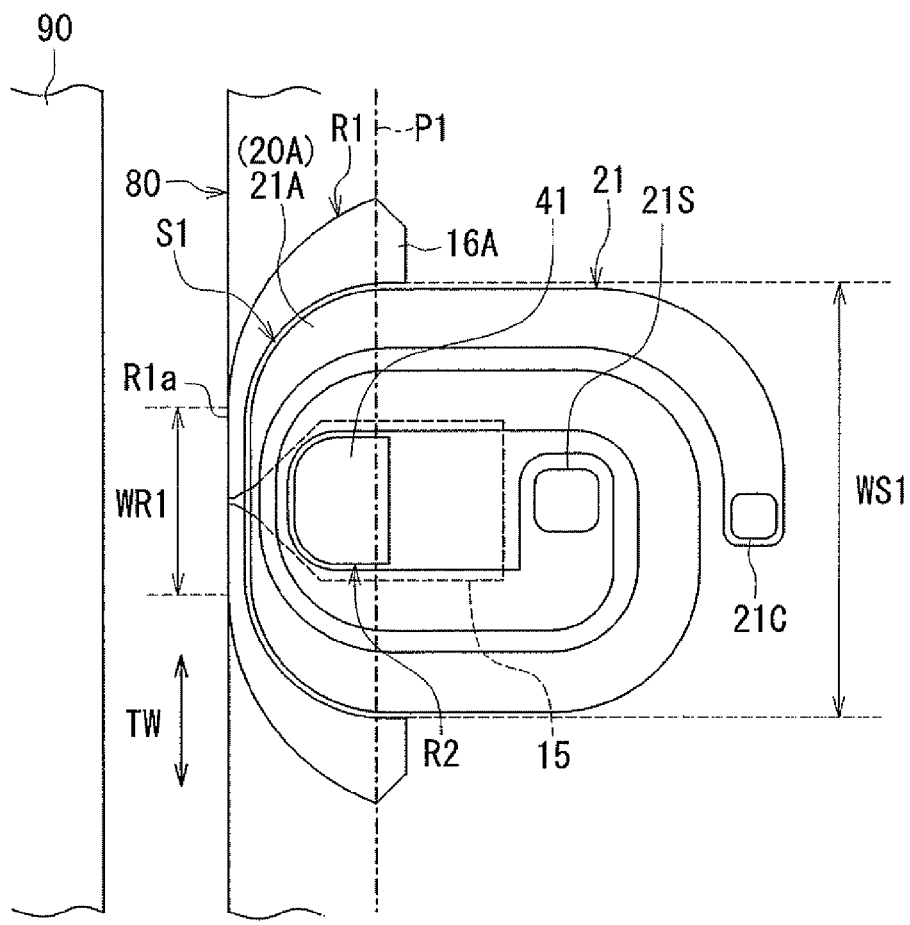
FIG. 6 is a plan view showing a part of a first coil surrounding portion and its periphery in the magnetic head according to the first embodiment of the invention.
Figure 7:
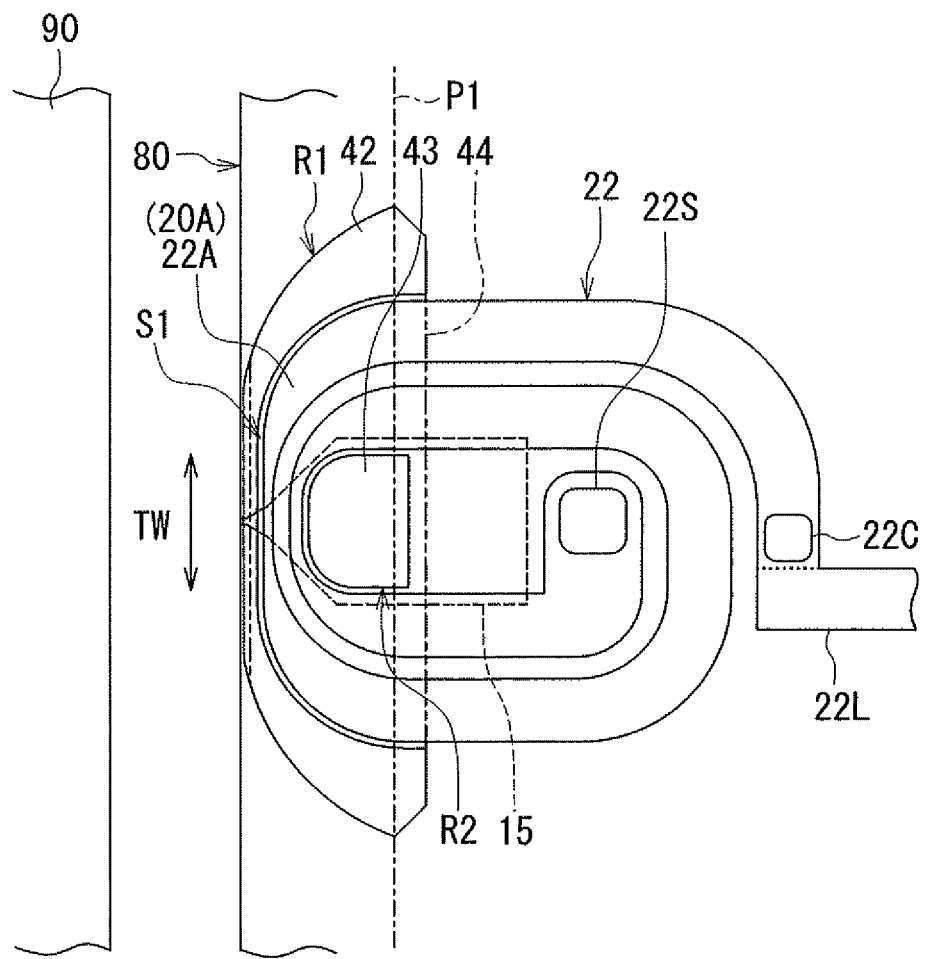
FIG. 7 is a plan view showing another part of the first coil surrounding portion and its periphery in the magnetic head according to the first embodiment of the invention.

Preferred embodiments of the present invention will now be described in detail with reference to the drawings. First, reference is made to FIG. 1 to FIG. 7 to describe the configuration of a magnetic head according to a first embodiment of the invention. FIG. 1 is a cross-sectional view showing the magnetic head according to the present embodiment. The arrow with the symbol T in FIG. 1 indicates the direction of travel of a recording medium. FIG. 2 is a front view showing the medium facing surface of the magnetic head according to the present embodiment. FIG. 3 is a plan view showing a part of a second coil surrounding portion and its periphery. FIG. 4 is a plan view showing another part of the second coil surrounding portion and its periphery. FIG. 5 is a plan view showing a main pole and two side shields. FIG. 6 is a plan view showing a part of a first coil surrounding portion and its periphery. FIG. 7 is a plan view showing another part of the first coil surrounding portion and its periphery. In each of FIG. 2 to FIG. 7, the arrow with the symbol TW indicates the track width direction.

As shown in FIG. 1 and FIG. 2, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 80 facing a recording medium 90. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The parts from the first read shield layer 3 to the second read shield layer 7 constitute a read head unit 8. The magnetic head further includes an insulating layer 81 made of an insulating material and disposed on the second read shield layer 7, a middle shield layer 82 made of a magnetic material and disposed on the insulating layer 81, a nonmagnetic layer 83 made of a nonmagnetic material and disposed on the middle shield layer 82, and an insulating layer 84 made of an insulating material and disposed around the read head unit 8, the insulating layer 81, the middle shield layer 82 and the nonmagnetic layer 83. The insulating layers 81 and 84 and the nonmagnetic layer 83 are made of alumina, for example.

The magnetic head further includes a write head unit 9 disposed on the nonmagnetic layer 83 and the insulating layer 84. The write head unit 9 includes a coil, a main pole 15, and a return path section R. The coil produces a magnetic field corresponding to data to be written on the recording medium 90. The coil includes a first winding portion 20 and a second winding portion 10. The first winding portion 20 and the second winding portion 10 are both made of a conductive material such as copper. The first winding portion 20 and the second winding portion 10 are connected in series or in parallel. The main pole 15 has an end face located in the medium facing surface 80. The main pole 15 allows a magnetic flux corresponding to the magnetic field produced by the coil to pass, and produces a write magnetic field for writing data on the recording medium 90 by means of a perpendicular magnetic recording system. FIG. 1 shows a cross section that intersects the end face of the main pole 15 located in the medium facing surface 80 and that is parallel to the direction T of travel of the recording medium 90 and perpendicular to the medium facing surface 80 (this cross section will hereinafter be referred to as the main cross section).

The return path section R is made of a magnetic material. The material employed for the return path section R may be CoFeN, CoNiFe, NiFe, or CoFe, for example. As shown in FIG. 1, the return path section R includes a first coil surrounding portion R1, a first connecting portion R2, a second coil surrounding portion R3, and a second connecting portion R4. The first coil surrounding portion R1 is located on the front side in the direction T of travel of the recording medium 90 relative to the main pole 15. The first connecting portion R2 is located away from the medium facing surface 80, and connects the main pole 15 and the first coil surrounding portion R1 to each other, thereby magnetically coupling the main pole 15 and the first coil surrounding portion R1 to each other. The second coil surrounding portion R3 is located on the rear side in the direction T of travel of the recording medium 90 relative to the main pole 15. The second connecting portion R4 is located away from the medium facing surface 80, and connects the main pole 15 and the second coil surrounding portion R3 to each other, thereby magnetically coupling the main pole 15 and the second coil surrounding portion R3 to each other.

As shown in FIG. 2, the first coil surrounding portion R1 has a first end face R1a located in the medium facing surface 80 and lying on the front side in the direction T of travel of the recording medium 90 relative to the end face of the main pole 15. As shown in FIG. 1, the first connecting portion R2 has a contact surface R2a in contact with the main pole 15. As shown in FIG. 2, the second coil surrounding portion R3 has a second end face R3a located in the medium facing surface 80 and lying on the rear side in the direction T of travel of the recording medium 90 relative to the end face of the main pole 15.

As shown in FIG. 2, the write head unit 9 further includes two side shields 16C and 16D. The two side shields 16C and 16D are located on opposite sides of the main pole 15 in the track width direction TW. The two side shields 16C and 16D have two end faces 16Ca and 16Da, respectively. The two end faces 16Ca and 16Da are located in the medium facing surface 80 and lie on opposite sides of the end face of the main pole 15 in the track width direction TW. In the medium facing surface 80, the end faces R1a, R3a, 16Ca, and 16Da wrap around the end face of the main pole 15.

The side shields 16C and 16D are each made of a magnetic material. Examples of materials that can be used for the side shields 16C and 16D include CoFeN, CoNiFe, NiFe, and CoFe.

The second coil surrounding portion R3 includes a second shield 16B and magnetic layers 31, 32 and 34. The magnetic layer 32 and its periphery are shown in FIG. 3. The second shield 16B and its periphery are shown in FIG. 4. The second connecting portion R4 includes magnetic layers 33, 35 and 36. The magnetic layer 31 is located on the nonmagnetic layer 83. The magnetic layers 32 and 33 are both located on the magnetic layer 31. The magnetic layer 32 is located near the medium facing surface 80. The magnetic layer 33 is located farther from the medium facing surface 80 than is the magnetic layer 32. Each of the magnetic layers 31 and 32 has an end face facing toward the medium facing surface 80 and located at a distance from the medium facing surface 80. As shown in FIG. 3, the second winding portion 10 of the coil is wound approximately four turns around the magnetic layer 33.

The magnetic head further includes: an insulating layer 51 made of an insulating material, disposed on the nonmagnetic layer 83 and the insulating layer 84 and surrounding the magnetic layer 31; an insulating film 52 made of an insulating material and isolating the second winding portion 10 from the magnetic layers 31 to 33; an insulating layer 53 made of an insulating material and disposed in the space between every adjacent turns of the second winding portion 10; and an insulating layer 54 made of an insulating material and disposed around the second winding portion 10 and the magnetic layer 32. The top surfaces of the second winding portion 10, the magnetic layers 32 and 33, the insulating film 52, and the insulating layers 53 and 54 are even with each other. The insulating layers 51 and 54 and the insulating film 52 are made of alumina, for example. The insulating layer 53 is made of photoresist, for example.

The magnetic layer 34 is disposed on the magnetic layer 32 and the insulating layer 54. The magnetic layer 35 is disposed on the magnetic layer 33. The magnetic layer 34 has a front end face located in the medium facing surface 80. The magnetic head further includes: an insulating layer 55 made of an insulating material and disposed over the top surfaces of the second winding portion 10, the insulating film 52 and the insulating layers 53 and 54; and an insulating layer 56 made of an insulating material, disposed on the insulating layer 55 and surrounding the magnetic layers 34 and 35. The top surfaces of the magnetic layers 34 and 35 and the insulating layer 56 are even with each other. The insulating layers 55 and 56 are made of alumina, for example.

The second shield 16B is disposed on the magnetic layer 34. The magnetic layer 36 is disposed on the magnetic layer 35. As shown in FIG. 1 and FIG. 2, the second shield 16B has a front end face located in the medium facing surface 80, a rear end face opposite to the front end face, a bottom surface, and a top surface inclined relative to a direction perpendicular to the medium facing surface 80. The second end face R3a of the second coil surrounding portion R3 is composed of the front end face of the second shield 16B and the front end face of the magnetic layer 34. The magnetic head further includes a nonmagnetic layer 57 made of a nonmagnetic material. The nonmagnetic layer 57 is disposed on the top surface of the insulating layer 56 and part of the top surface of the magnetic layer 34, and surrounds the second shield 16B and the magnetic layer 36. The nonmagnetic layer 57 is made of alumina, for example.

The main pole 15 has a top surface (see FIG. 1) lying at a forward end in the direction T of travel of the recording medium 90, a bottom end (see FIG. 1) opposite to the top surface, and first and second side parts (see FIG. 2) opposite to each other in the track width direction TW. The side shield 16C has a first sidewall opposed to the first side part of the main pole 15. The side shield 16D has a second sidewall opposed to the second side part of the main pole 15.

The side shields 16C and 16D are disposed on the second shield 16B and in contact with the top surface of the second shield 16B. The magnetic head further includes a second gap layer 18 made of a nonmagnetic material. Part of the second gap layer 18 is located between the main pole 15 and each of the second shield 16B and the side shields 16C and 16D. The second gap layer 18 is arranged to extend along the sidewalls of the side shields 16C and 16D, the top surface of the second shield 16B and the top surface of the nonmagnetic layer 57. The nonmagnetic material used to form the second gap layer 18 may be an insulating material or a nonmagnetic metal material. Alumina is an example of insulating materials that can be used to form the second gap layer 18. Ru is an example of nonmagnetic metal materials that can be used to form the second gap layer 18. The second gap layer 18 has an opening for exposing the top surface of the magnetic layer 36.

The main pole 15 is disposed on the second shield 16B and the nonmagnetic layer 57 such that the second gap layer 18 is interposed between the main pole 15 and the top surface of each of the second shield 16B and the nonmagnetic layer 57. As shown in FIG. 2, the second gap layer 18 is interposed also between the main pole 15 and each of the side shields 16C and 16D.

A part of the bottom end of the main pole 15 located away from the medium facing surface 80 is in contact with the top surface of the magnetic layer 36. The main pole 15 is made of a magnetic metal material. The material used for the main pole 15 may be NiFe, CoNiFe, or CoFe, for example. The shape of the main pole 15 will be described in detail later.

The magnetic head further includes a nonmagnetic layer 60 made of a nonmagnetic material and disposed around the main pole 15 and the side shields 16C and 16D. In the present embodiment, the nonmagnetic layer 60 is made of a nonmagnetic insulating material such as alumina, in particular.

The magnetic head further includes a nonmagnetic metal layer 58 made of a nonmagnetic metal material, located away from the medium facing surface 80 and lying on part of the top surface of the main pole 15, and an insulating layer 59 made of an insulating material and lying on the top surface of the nonmagnetic metal layer 58. The nonmagnetic metal layer 58 is made of Ru, NiCr, or NiCu, for example. The insulating layer 59 is made of alumina, for example.

The magnetic head further includes a first gap layer 19 made of a nonmagnetic material. The first gap layer 19 is disposed to cover the main pole 15, the nonmagnetic metal layer 58 and the insulating layer 59. The material used for the first gap layer 19 may be a nonmagnetic insulating material such as alumina, or a nonmagnetic conductive material such as Ru, NiCu, Ta, W, NiB, or NiP.

The first coil surrounding portion R1 includes a first shield 16A and magnetic layers 42 and 44. The first shield 16A and its periphery are shown in FIG. 6. The magnetic layer 42 and its periphery are shown in FIG. 7. The first shield 16A is disposed on the side shields 16C and 16D and the first gap layer 19, and is in contact with the top surfaces of the side shields 16C and 16D and the first gap layer 19. The side shields 16C and 16D magnetically couple the first shield 16A and the second shield 16B to each other. Part of the first gap layer 19 is located between the main pole 15 and the first shield 16A.

As shown in FIG. 1 and FIG. 2, the first shield 16A has a front end face located in the medium facing surface 80, a rear end face opposite to the front end face, a bottom surface including an inclined portion inclined relative to the direction perpendicular to the medium facing surface 80, a top surface, and a connecting surface connecting the front end face and the top surface to each other. The distance from the top surface 1a of the substrate 1 to an arbitrary point on the connecting surface increases with increasing distance from the arbitrary point to the medium facing surface 80.

The first end face R1a of the first coil surrounding portion R1 is formed by the front end face of the first shield 16A. In the medium facing surface 80, part of the first end face R1a is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The first connecting portion R2 includes magnetic layers 41 and 43. The magnetic layer 41 has the contact surface R2a. The magnetic layer 41 is located away from the medium facing surface 80 and lies on the main pole 15.

The first winding portion 20 of the coil includes a first layer 21 and a second layer 22. As shown in FIG. 6, the first layer 21 is wound two turns around the magnetic layer 41. The magnetic head further includes: an insulating film 61 made of an insulating material and interposed between the first layer 21 and each of the first shield 16A, the first gap layer 19, the magnetic layer 41 and the nonmagnetic layer 60; an insulating layer 62 made of an insulating material and disposed in the space between adjacent turns of the first layer 21; and a nonmagnetic layer 63 made of a nonmagnetic material and disposed around the first layer 21 and the first shield 16A. The insulating film 61 is made of alumina, for example. The insulating layer 62 is made of photoresist, for example. The nonmagnetic layer 63 is made of an inorganic insulating material, for example. The inorganic insulating material is alumina or silicon oxide, for example. The top surfaces of the first shield 16A, the first layer 21, the magnetic layer 41, the insulating film 61, the insulating layer 62, and the nonmagnetic layer 63 are even with each other.

The magnetic layer 42 is disposed on the first shield 16A. The magnetic layer 43 is disposed on the magnetic layer 41. The magnetic layer 42 has an end face facing toward the medium facing surface 80 and located at a distance from the medium facing surface 80. The distance from the top surface 1a of the substrate 1 to an arbitrary point on this end face increases with increasing distance from the arbitrary point to the medium facing surface 80.

As shown in FIG. 7, the second layer 22 is wound approximately two turns around the magnetic layer 43. The magnetic head further includes: an insulating film 64 made of an insulating material and interposed between the second layer 22 and each of the first layer 21, the magnetic layers 42 and 43 and the insulating layer 62; an insulating layer 65 made of an insulating material and disposed in the space between adjacent turns of the second layer 22; and an insulating layer (not illustrated) made of an insulating material and disposed around the second layer 22 and the magnetic layer 42. The top surfaces of the second layer 22, the magnetic layers 42 and 43, the insulating film 64, the insulating layer 65 and the non-illustrated insulating layer are even with each other. The magnetic head further includes an insulating layer 66 made of an insulating material and disposed over the top surfaces of the second layer 22, the insulating film 64 and the insulating layer 65. The insulating film 64, the insulating layer 66 and the non-illustrated insulating layer are made of alumina, for example. The insulating layer 65 is made of photoresist, for example.

The magnetic layer 44 is disposed over the magnetic layers 42 and 43 and the insulating layer 66, and connects the magnetic layer 42 and the magnetic layer 43 to each other. The magnetic layer 44 has an end face facing toward the medium facing surface 80 and located at a distance from the medium facing surface 80. The distance from the top surface 1a of the substrate 1 to an arbitrary point on this end face increases with increasing distance from the arbitrary point to the medium facing surface 80. The magnetic head further includes an insulating layer 67 made of an insulating material and disposed around the magnetic layer 44. The insulating layer 67 is made of alumina, for example. The top surfaces of the magnetic layer 44 and the insulating layer 67 are even with each other.

The magnetic head further includes a protective layer 70 made of a nonmagnetic material and disposed to cover the write head unit 9. The protective layer 70 is made of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The read head unit 8 is located on the rear side in the direction T of travel of the recording medium 90, that is, on the leading side, relative to the write head unit 9.

The write head unit 9 includes the coil having the first winding portion 20 and the second winding portion 10, the main pole 15, the return path section R, and the side shields 16C and 16D. The return path section R includes the first coil surrounding portion R1, the first connecting portion R2, the second coil surrounding portion R3, and the second connecting portion R4. The first coil surrounding portion R1 has the first end face R1a. The first connecting portion R2 has the contact surface R2a. The second coil surrounding portion R3 has the second end face R3a.

The first coil surrounding portion R1 includes the first shield 16A and the magnetic layers 42 and 44. The first shield 16A includes a central portion, and two side portions located on opposite sides of the central portion in the track width direction TW. The central portion includes the front end face of the first shield 16A (the first end face R1a) and is disposed to intersect the main cross section. The two side portions are greater than the central portion in maximum length in the direction perpendicular to the medium facing surface 80. Like the first shield 16A, the magnetic layer 42 has a central portion intersecting the main cross section, and two side portions. However, the central portion of the magnetic layer 42 does not have a front end face located in the medium facing surface 80.

The second coil surrounding portion R3 includes the second shield 16B and the magnetic layers 31, 32 and 34. The second shield 16B includes a central portion, and two side portions located on opposite sides of the central portion in the track width direction TW. The central portion includes the front end face located in the medium facing surface 80 and is disposed to intersect the main cross section. The two side portions are greater than the central portion in maximum length in the direction perpendicular to the medium facing surface 80. Like the second shield 16B, each of the magnetic layers 32 and 34 has a central portion intersecting the main cross section, and two side portions.

Here, assume a first virtual plane P1 and a second virtual plane P2. The first virtual plane P1 intersects the contact surface R2a and is parallel to the medium facing surface 80. The second virtual plane P2 includes the contact surface R2a and is perpendicular to the direction T of travel of the recording medium 90. The first coil surrounding portion R1 is provided for forming a first coil receiving space S1. As shown in FIG. 1, FIG. 6 and FIG. 7, the first coil receiving space S1 is a space defined by the first virtual plane P1, the second virtual plane P2 and the first coil surrounding portion R1.

FIG. 6 and FIG. 7 show an example in which the width of the first coil receiving space S1 in the track width direction TW increases with increasing distance from the medium facing surface 80. As shown in FIG. 6, the width of the first end face R1a in the track width direction TW will be represented by symbol WR1, and the maximum width of the first coil receiving space S1 in the track width direction TW will be represented by symbol WS1. The width WR1 is smaller than the width WS1. The width WR1 preferably falls within the range of 2 to 10 μm, and more preferably within the range of 2 to 7 μm.

Further, assume a third virtual plane P3 parallel to the medium facing surface 80, and a fourth virtual plane P4 that is located on the rear side in the direction T of travel of the recording medium 90 relative to the main pole 15 and is perpendicular to the direction T of travel of the recording medium 90. In the present embodiment, in particular, the third virtual plane P3 intersects the contact surface R2a. The second coil surrounding portion R3 is provided for forming a second coil receiving space S2. As shown in FIG. 1, FIG. 3 and FIG. 4, the second coil receiving space S2 is a space defined by the third virtual plane P3, the fourth virtual plane P4 and the second coil surrounding portion R3.

FIG. 3 and FIG. 4 show an example in which the width of the second coil receiving space S2 in the track width direction TW increases with increasing distance from the medium facing surface 80. As shown in FIG. 4, the width of the second end face R3a in the track width direction TW will be represented by symbol WR3, and the maximum width of the second coil receiving space S2 in the track width direction TW will be represented by symbol WS2. The width WR3 is smaller than the width WS2. The width WR3 preferably falls within the range of 2 to 10 μm, and more preferably within the range of 2 to 7 μm. The width WR3 may be equal to the width WR1.

The distance between an edge of the end face 16Ca of the side shield 16C farthest from the end face Da of the side shield 16D and an edge of the end face 16Da of the side shield 16D farthest from the end face 16Ca of the side shield 16C preferably falls within the range of 2 to 10 μm, and more preferably within the range of 2 to 7 μm. This distance, the width WR1 and the width WR3 may all be equal.

The coil includes a first portion 20A received in the first coil receiving space S1, and a second portion 10A received in the second coil receiving space S2. The first winding portion 20, the second winding portion 10, the first portion 20A and the second portion 10A of the coil will now be described in detail with reference to FIG. 1 and FIG. 3 to FIG. 7.

FIG. 3 shows the second winding portion 10. The second winding portion 10 is wound approximately four turns around the magnetic layer 33 constituting part of the second connecting portion R4. In the present embodiment, the second portion 10A is part of the second winding portion 10. As shown in FIG. 1 and FIG. 3, no portion of the coil other than the second portion 10A is present in a region that is located on the rear side in the direction T of travel of the recording medium 90 relative to the fourth virtual plane P4 and sandwiched between the third virtual plane P3 and the medium facing surface 80.

FIG. 6 shows the first layer 21 of the first winding portion 20. The first layer 21 is wound two turns around the magnetic layer 41 constituting a part of the first connecting portion R2. The first layer 21 includes a portion 21A received in the first coil receiving space S1. FIG. 7 shows the second layer 22 of the first winding portion 20. The second layer 22 is wound approximately two turns around the magnetic layer 43 constituting another part of the first connecting portion R2. The second layer 22 includes a portion 22A received in the first coil receiving space S1. In the present embodiment, the first portion 20A is composed of the portion 21A and the portion 22A. In other words, the first portion 20A is part of the first winding portion 20. As shown in FIG. 1, FIG. 6 and FIG. 7, no portion of the coil other than the first portion 20A (the portions 21A and 22A) is present in a region that is located on the front side in the direction T of travel of the recording medium 90 relative to the second virtual plane P2 and sandwiched between the first virtual plane P1 and the medium facing surface 80.

The second winding portion 10 has a coil connection 10E located near an end of the second winding portion 10. A lead 10L is connected to the other end of the second winding portion 10. The first layer 21 of the first winding portion 20 has two coil connections 21S and 21C located near opposite ends of the first layer 21. The coil connection 10E and the coil connection 21S are electrically connected to each other via three connecting layers 71, 72 and 73 of columnar shape that penetrate a plurality of layers interposed between the second winding portion 10 and the first layer 21. The connecting layers 71 to 73 are stacked in this order on the coil connection 10E. The coil connection 21S is disposed on the connecting layer 73. The connecting layers 71 and 72 are shown in FIG. 4. The connecting layer 73 is shown in FIG. 5. The connecting layers 71 to 73 are each made of a conductive material such as copper.

The second layer 22 of the first winding portion 20 has two coil connections 22S and 22C located near both ends of the second layer 22. The coil connections 22S and 22C penetrate the insulating film 64 and are electrically connected to the coil connections 21S and 21C of the first layer 21, respectively. A lead 22L is connected to an end of the second layer 22 located near the coil connection 22C. FIG. 3 to FIG. 7 show an example in which the first layer 21 and the second layer 22 are connected in parallel between a pair of coil connections 21S, 22S and a pair of coil connections 21C, 22C. The second winding portion 10 is connected in series to the first winding portion 20 by the coil connections 10E, 21S and 22S electrically connected to each other.

The shape of the main pole 15 will now be described in detail with reference to FIG. 1, FIG. 2 and FIG. 5. As shown in FIG. 5, the main pole 15 includes a narrow portion 15A and a wide portion 15B. The narrow portion 15A has an end face located in the medium facing surface 80 and an end portion opposite to the end face. The wide portion 15B is connected to the end portion of the narrow portion 15A. Further, as shown in FIG. 1 and FIG. 2, the main pole 15 has the top surface located at the forward end in the direction T of travel of the recording medium 90, the bottom end opposite to the top surface, the first side part, and the second side part. The top surface of the main pole 15 includes the top surface of the narrow portion 15A and the top surface of the wide portion 15B. The top surface of the wide portion 15B is greater than the top surface of the narrow portion 15A in width in the track width direction TW.

The width of the top surface of the narrow portion 15A in the track width direction TW is generally constant regardless of the distance from the medium facing surface 80. The width of the top surface of the wide portion 15B in the track width direction TW is, for example, equal to that of the top surface of the narrow portion 15A at the boundary between the narrow portion 15A and the wide portion 15B, and gradually increases with increasing distance from the medium facing surface 80, then becoming constant. Here, the length of the narrow portion 15A in the direction perpendicular to the medium facing surface 80 will be referred to as the neck height. The neck height falls within the range of 0 to 0.3 μm, for example. A zero neck height means that the narrow portion 15A is not present and thus an end face of the wide portion 15B is located in the medium facing surface 80.

The top surface of the main pole 15 includes a first inclined portion and a first flat portion arranged in this order, the first inclined portion being closer to the medium facing surface 80. The first inclined portion has a first end located in the medium facing surface 80 and a second end opposite thereto. The first flat portion is connected to the second end of the first inclined portion. The first inclined portion is inclined such that its second end is located on the front side in the direction T of travel of the recording medium 90 relative to its first end. The first flat portion extends in a direction substantially perpendicular to the medium facing surface 80. The bottom surface of the first shield 16A includes a portion that is opposed to the first inclined portion of the top surface of the main pole 15 with the first gap layer 19 interposed therebetween.

The bottom end of the main pole 15 includes a second inclined portion and a second flat portion arranged in this order, the second inclined portion being closer to the medium facing surface 80. The second inclined portion has a first end located in the medium facing surface 80 and a second end opposite thereto. The second inclined portion may be an edge formed by two intersecting planes, or may be a plane connecting two planes to each other. The second flat portion is a plane connected to the second end of the second inclined portion. The second inclined portion is inclined such that its second end is located on the rear side in the direction T of travel of the recording medium 90 relative to its first end. The second flat portion extends in a direction substantially perpendicular to the medium facing surface 80.

The end face of the main pole 15 located in the medium facing surface 80 has a first side adjacent to the first gap layer 19, a second side connected to one end of the first side, and a third side connected to the other end of the first side. The first side defines the track width. The position of an end of a record bit to be recorded on the recording medium 90 depends on the position of the first side. The width in the track width direction TW of the end face of the main pole 15 located in the medium facing surface 80 decreases with increasing distance from the first side, that is, with increasing proximity to the top surface 1a of the substrate 1. Each of the second side and the third side forms an angle of, for example, 7° to 17°, or preferably 10° to 15°, relative to a direction perpendicular to the top surface 1a of the substrate 1. The first side has a length in the range of 0.05 to 0.20 μm, for example.

The specific function and effects of the magnetic head according to the present embodiment will now be described. In the present embodiment, the return path section R includes the first coil surrounding portion R1 for forming the first coil receiving space S1, and the second coil surrounding portion R3 for forming the second coil receiving space S2. The first coil surrounding portion R1 has the first end face R1a located in the medium facing surface 80 and lying on the front side in the direction T of travel of the recording medium 90 relative to the end face of the main pole 15. The second coil surrounding portion R3 has the second end face R3a located in the medium facing surface 80 and lying on the rear side in the direction T of travel of the recording medium 90 relative to the end face of the main pole 15.

The return path section R has the function of capturing from the first and second end faces R1a and R3a a magnetic flux that is produced from the end face of the main pole 15 and spreads in directions other than the direction perpendicular to the plane of the recording medium 90, and thereby preventing the magnetic flux from reaching the recording medium 90. The return path section R also has the function of capturing from the first and second end faces R1a and R3a a magnetic flux that has been produced from the end face of the main pole 15 and has magnetized the recording medium 90, and allowing the magnetic flux to flow back to the main pole 15. By virtue of such functions of the return path section R, the present embodiment makes it possible to prevent the occurrence of unwanted erasure and provide a further improvement in recording density.

If the end face of the return path section located in the medium facing surface 80 is exposed over a large area in the medium facing surface 80, part of the magnetic flux captured into the return path section from a portion of the end face of the return path section located near the end face of the main pole 15 may leak from another portion of the end face of the return path section toward the recording medium 90. This may result in the occurrence of unwanted erasure. On the other hand, if the return path section is reduced in dimension in the track width direction, the volume of the return path section decreases and the return path section thus becomes prone to flux saturation. As a result, there arises a problem that magnetic flux leaks from the end face of the return path section toward the recording medium 90 to cause unwanted erasure.

In the present embodiment, the first coil surrounding portion R1 of the return path section R is shaped to form the first coil receiving space S1, that is, shaped to surround the first portion 20A of the coil. This allows the first coil surrounding portion R1 to be large in volume. On the other hand, the width WR1 of the first end face R1a in the track width direction TW is smaller than the maximum width WS1 of the first coil receiving space S1 in the track width direction TW. This allows the first end face R1a to be small in area. The present embodiment thus makes it possible that the first coil surrounding portion R1 is large in volume while the first end face R1*a* is small in area.

Likewise, the second coil surrounding portion R3 of the return path section R is shaped to form the second coil receiving space S2, that is, shaped to surround the second portion 10A of the coil. This allows the second coil surrounding portion R3 to be large in volume. On the other hand, the width WR3 of the second end face R3*a* in the track width direction TW is smaller than the maximum width WS2 of the second coil receiving space S2 in the track width direction TW. This allows the second end face R3*a* to be small in area. The present embodiment thus makes it possible that the second coil surrounding portion R3 is large in volume while the second end face R3*a* is small in area.

As can be seen from the foregoing, the present embodiment allows the return path section R to be large in volume while allowing the end face R1*a*, R3*a* of the return path section R exposed in the medium facing surface 80 to be small in area. Consequently, the present embodiment makes it possible to prevent leakage of magnetic flux from the end face of the return path section that may occur in the case where the end face of the return path section is exposed over a large area in the medium facing surface 80 or where the return path section is small in volume. The present embodiment thus makes it possible to prevent unwanted erasure from occurring due to leakage of magnetic flux toward the recording medium 90 from the end face R1*a*, R3*a* of the return path section R exposed in the medium facing surface 80.

The magnetic head according to the present embodiment includes the two side shields 16C and 16D. The two side shields 16C and 16D have two end faces 16Ca and 16Da located in the medium facing surface 80 and lying on opposite sides of the end face of the main pole 15 in the track width direction TW. The two side shields 16C and 16D are magnetically connected to the return path section R. The two side shields 16C and 16D have the function of capturing from the two end faces 16Ca and 16Da a magnetic flux that is produced from the end face of the main pole 15 and spreads in the track width direction. The magnetic flux captured by the two side shields 16C and 16D flows back to the main pole 15 through the return path section R. According to the present embodiment, the function of the side shields 16C and 16D also contributes to the prevention of unwanted erasure.

In the present embodiment, by way of example, the number of turns of the first layer 21 of the first winding portion 20 of the coil and the number of turns of the second layer 22 of the first winding portion 20 of the coil are both two, and the number of turns of the second winding portion 10 of the coil is approximately four. Nevertheless, the number of turns of each of the first layer 21, the second layer 22, and the second winding portion 10 is not limited to the aforementioned example. However, an increase in the number of turns of each of the first layer 21 and the second layer 22 leads to an increase in the outermost diameter of each of the first layer 21 and the second layer 22, thus making it difficult to reduce the width WR1 of the first end face R1*a* of the first coil surrounding portion R1. Likewise, an increase in the number of turns of the second winding portion 10 leads to an increase in the outermost diameter of the second winding portion 10, thus making it difficult to reduce the width WR3 of the second end face R3*a* of the second coil surrounding portion R3. In view of this, the number of turns of each of the first layer 21, the second layer 22 and the second winding portion 10 is preferably in the range of one turn to four turns, more preferably in the range of one turn to two turns.

Second Embodiment

Figure 8:
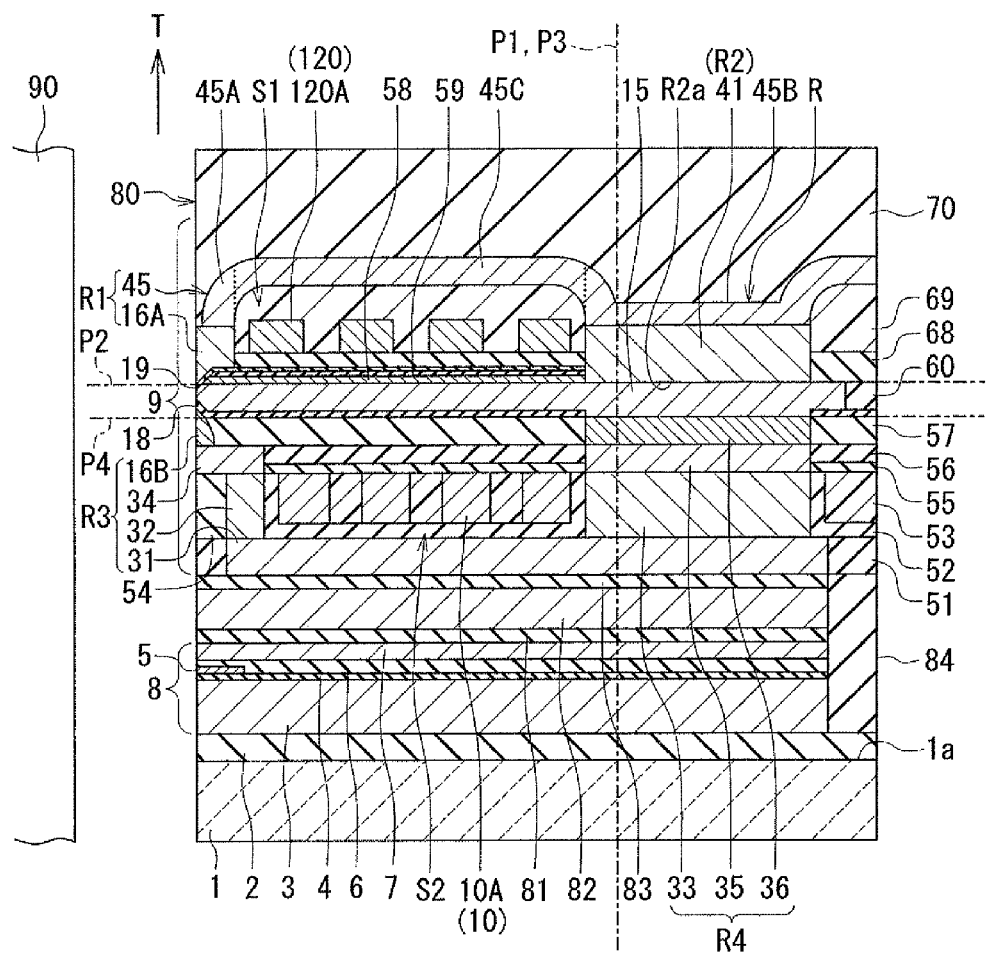
FIG. 8 is a cross-sectional view showing a magnetic head according to a second embodiment of the invention.
Figure 9:
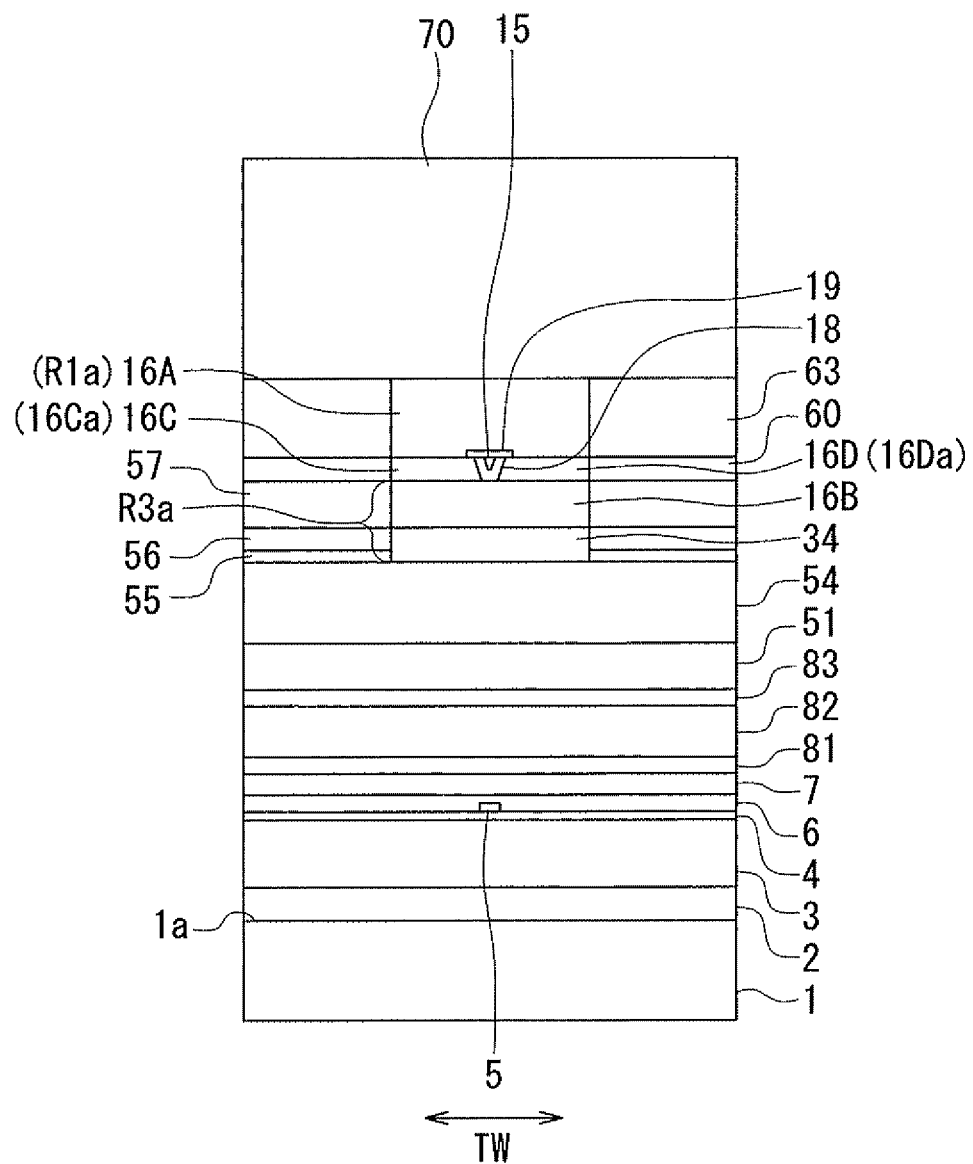
FIG. 9 is a front view showing the medium facing surface of the magnetic head according to the second embodiment of the invention.
Figure 10:
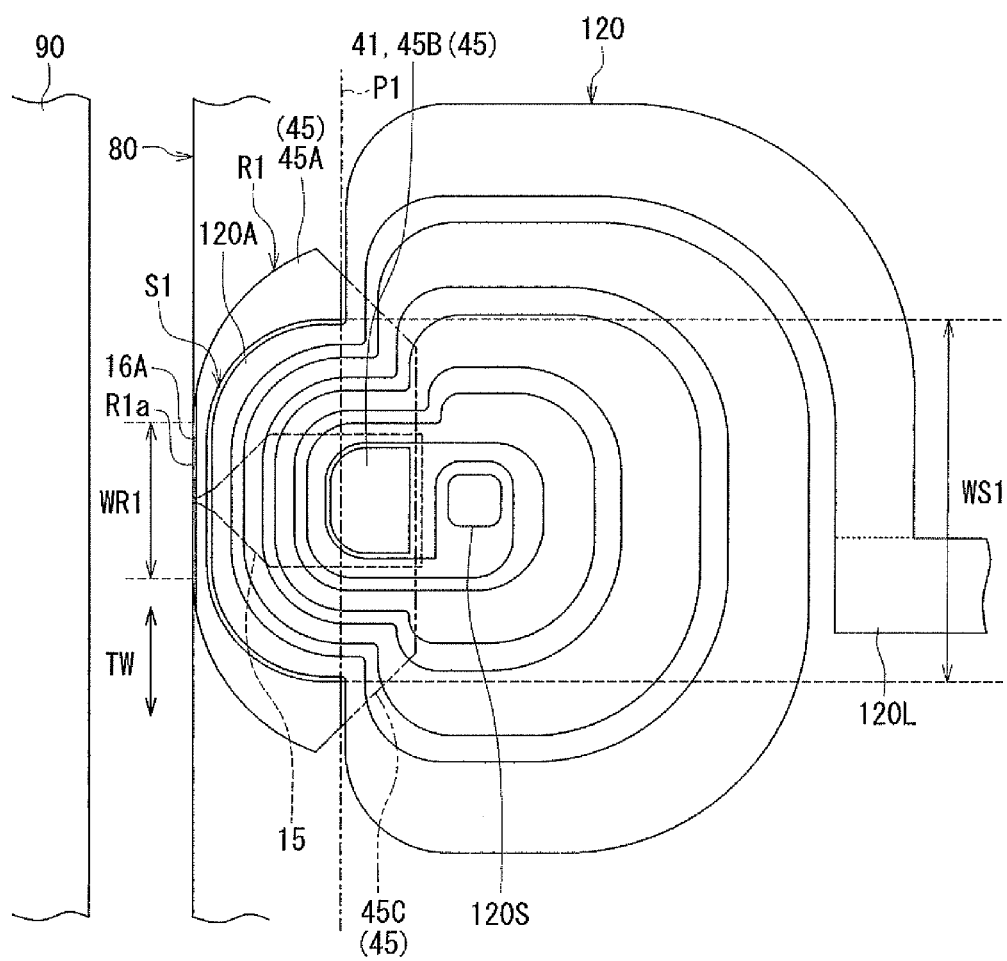
FIG. 10 is a plan view showing a part of the first coil surrounding portion and its periphery in the magnetic head according to the second embodiment of the invention.

A magnetic head according to a second embodiment of the invention will now be described with reference to FIG. 8 to FIG. 10. FIG. 8 is a cross-sectional view showing the magnetic head according to the present embodiment. FIG. 9 is a front view showing the medium facing surface of the magnetic head according to the present embodiment. FIG. 10 is a plan view showing a part of the first coil surrounding portion and its periphery.

The configuration of the magnetic head according to the present embodiment differs from the first embodiment in the following ways. In the magnetic head according to the present embodiment, there are not provided the magnetic layer 43, the insulating films 61 and 64, the insulating layers 62, 65, 66 and 67 and the nonmagnetic layer 63.

The magnetic head according to the present embodiment includes an insulating layer 68 made of an insulating material and disposed around the first shield 16A and the magnetic layer 41. Further, in the present embodiment, the coil has a first winding portion 120 in place of the first winding portion 20. The first winding portion 120 is located on the insulating layer 68. The magnetic head further includes an insulating layer 69 made of an insulating material and disposed to cover the first winding portion 120 and the insulating layer 68. The insulating layer 68 is made of alumina, for example. The insulating layer 69 is made of photoresist, for example.

Further, in the present embodiment, the first coil surrounding portion R1 has a magnetic layer 45 in place of the magnetic layers 42 and 44. The magnetic layer 45 is disposed on the first shield 16A, the magnetic layer 41 and the insulating layer 69, and connects the first shield 16A and the magnetic layer 41 to each other. The magnetic layer 45 has an end face facing toward the medium facing surface 80 and located at a distance from the medium facing surface 80.

The magnetic layer 45 includes a portion 45A located on the first shield 16A, a portion 45B located on the magnetic layer 41, and a portion 45C connecting the portions 45A and 45B to each other. In FIG. 8, the boundaries between the portions 45A to 45C are shown by dotted lines. The portion 45A includes a central portion intersecting the main cross section, and two side portions located on opposite sides of the central portion in the track width direction TW. The central portion is apart from the medium facing surface 80 and is disposed to intersect the main cross section. The two side portions are greater than the central portion in maximum length in the direction perpendicular to the medium facing surface 80.

The coil includes, in place of the first portion 20A, a first portion 120A received in the first coil receiving space S1. The first winding portion 120 and the first portion 120A of the coil will now be described in detail with reference to FIG. 8 and FIG. 10.

FIG. 10 shows the first winding portion 120. The first winding portion 120 is wound approximately four turns around the magnetic layer 41 constituting part of the first connecting portion R2. In the present embodiment, the first portion 120A is part of the first winding portion 120. As shown in FIG. 8 and FIG. 10, no portion of the coil other than the first portion 120A is present in the region located on the front side in the direction T of travel of the recording medium 90 relative to the second virtual plane P2 and sandwiched between the first virtual plane P1 and the medium facing surface 80.

The first winding portion 120 has a coil connection 120S located near an end of the first winding portion 120. A lead 120L is connected to the other end of the first winding portion 120. The coil connection 120S is electrically connected to the coil connection 10E (see FIG. 3) of the second winding portion 10 via the connecting layers 71, 72 and 73 (see FIG. 4 and FIG. 5) and a non-illustrated columnar connecting layer disposed on the connecting layer 73. The coil connection 120S is disposed on the non-illustrated columnar connecting layer. The non-illustrated columnar connecting layer is made of a conductive material such as copper. FIG. 3 and FIG. 10 show an example in which the first winding portion 120 and the second winding portion 10 are connected in series.

The remainder of configuration, function and effects of the present embodiment are similar to those of the first embodiment.

Third Embodiment

Figure 11:
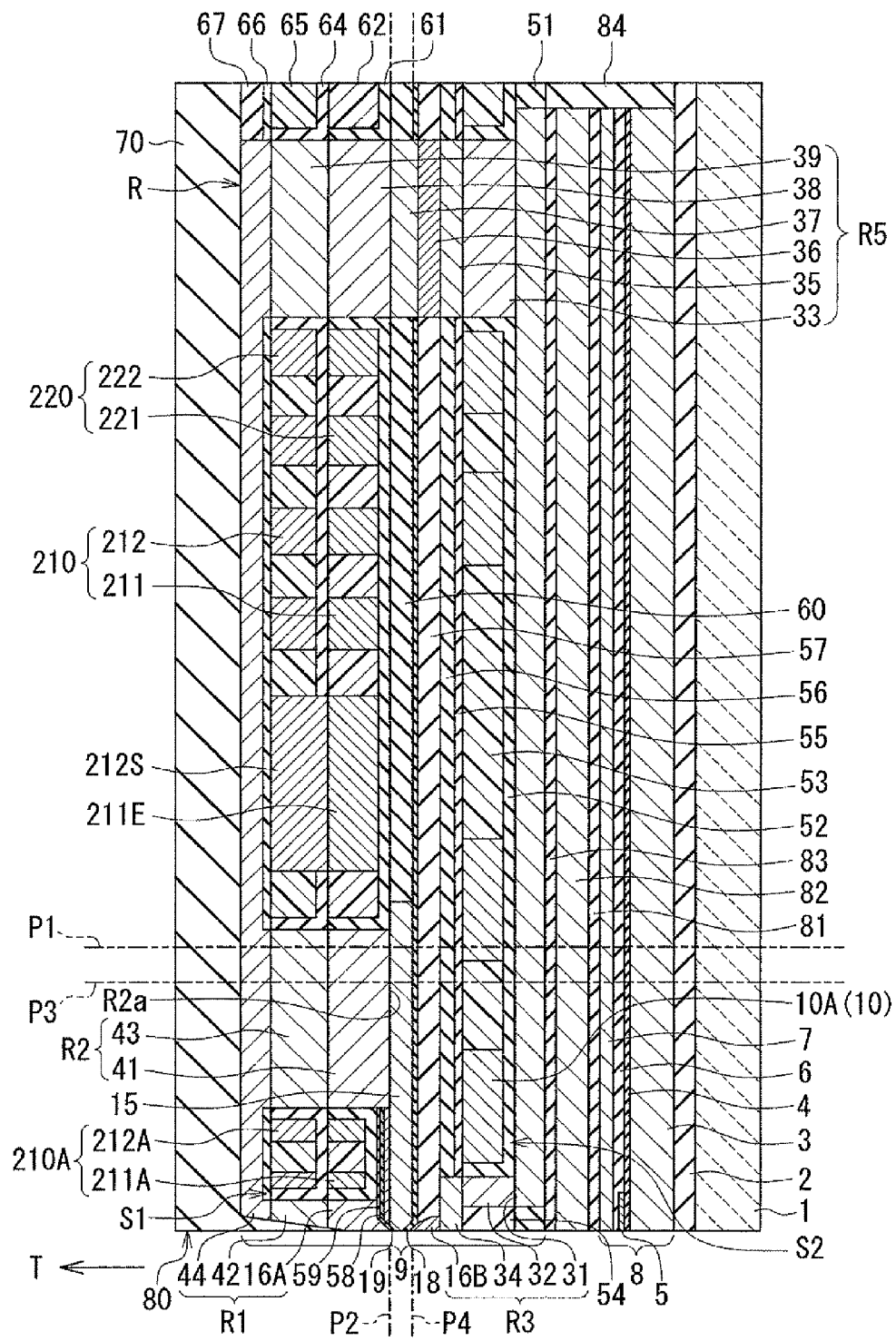
FIG. 11 is a cross-sectional view showing a magnetic head according to a third embodiment of the invention.
Figure 12:
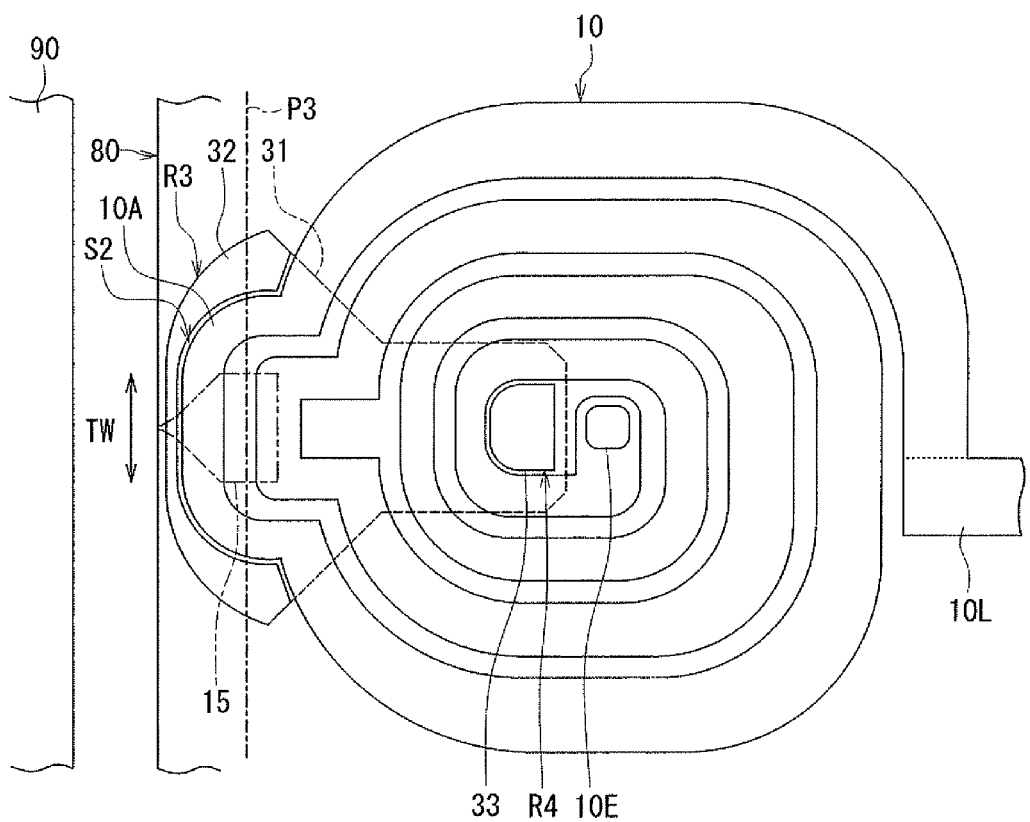
FIG. 12 is a plan view showing a part of the second coil surrounding portion and its periphery in the magnetic head according to the third embodiment of the invention.
Figure 13:
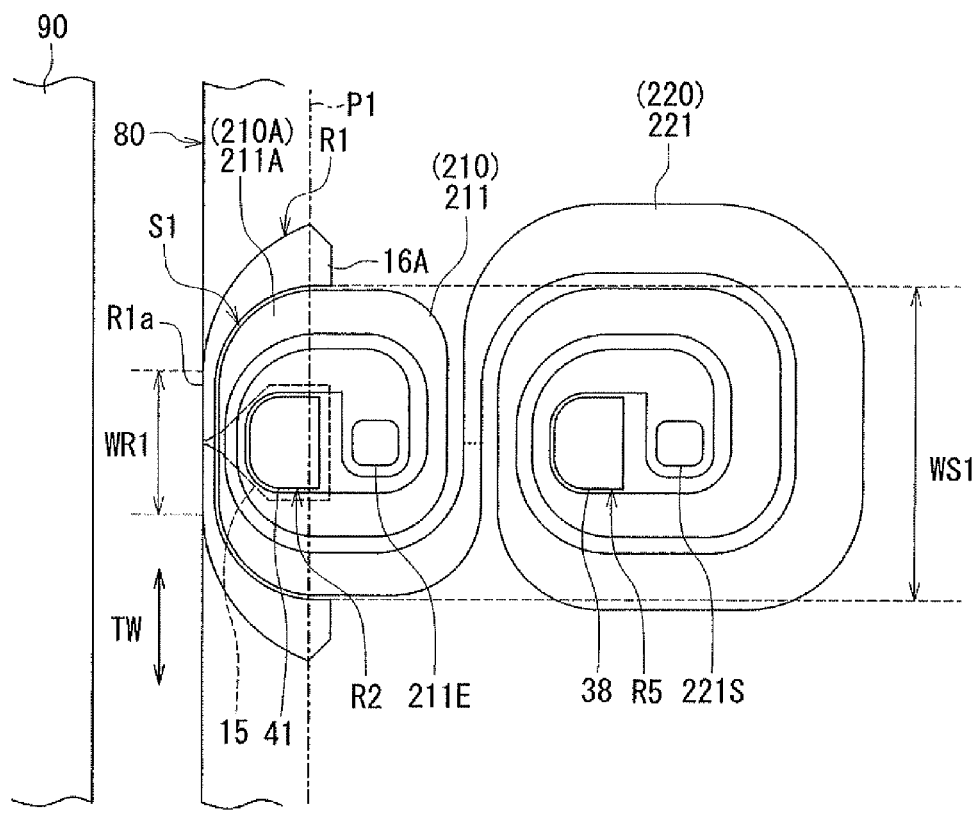
FIG. 13 is a plan view showing a part of the first coil surrounding portion and its periphery in the magnetic head according to the third embodiment of the invention.
Figure 14:
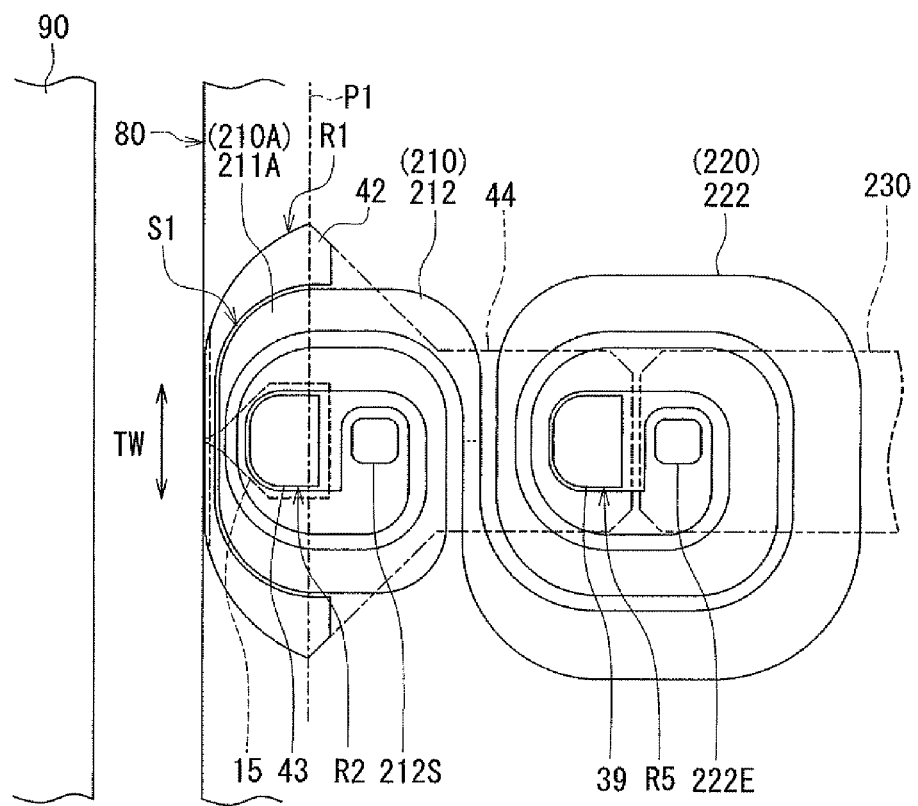
FIG. 14 is a plan view showing another part of the first coil surrounding portion and its periphery in the magnetic head according to the third embodiment of the invention.

A magnetic head according to a third embodiment of the invention will now be described with reference to FIG. 11 to FIG. 14. FIG. 11 is a cross-sectional view showing the magnetic head according to the present embodiment. FIG. 12 is a plan view showing a part of the second coil surrounding portion and its periphery. FIG. 13 is a plan view showing a part of the first coil surrounding portion and its periphery. FIG. 14 is a plan view showing another part of the first coil surrounding portion and its periphery.

The configuration of the magnetic head according to the present embodiment differs from the first embodiment in the following ways. In the magnetic head according to the present embodiment, the return path section R has a coupling portion R5 in place of the second connecting portion R4. As shown in FIG. 11, the coupling portion R5 is located away from the medium facing surface 80 and couples the first coil surrounding portion R1 and the second coil surrounding portion R3 to each other without being in contact with the main pole 15. In the present embodiment, in particular, the coupling portion R5 is located farther from the medium facing surface 80 than is the first connecting portion R2.

The coupling portion R5 includes magnetic layers 33, 35, 36, 37, 38, and 39. In the present embodiment, as shown in FIG. 11 and FIG. 12, the magnetic layer 31 is greater in length in the direction perpendicular to the medium facing surface 80 than in the first embodiment, and the magnetic layers 33, 35 and 36 are located farther from the medium facing surface 80 than in the first embodiment. As shown in FIG. 12, the second winding portion 10 of the coil is wound approximately four turns around the magnetic layer 33 constituting part of the coupling portion R5. The magnetic layer 37 lies on the magnetic layer 36 and is farther from the medium facing surface 80 than is the main pole 15. The nonmagnetic layer 60 is disposed around the magnetic layer 37. The second portion 10A received in the second coil receiving space S2 is part of the second winding portion 10.

In the present embodiment, the coil has a first winding portion 210 and a third winding portion 220 in place of the first winding portion 20. The first winding portion 210 includes a first layer 211 and a second layer 212. The third winding portion 220 includes a first layer 221 and a second layer 222. FIG. 13 shows the first layer 211 of the first winding portion 210 and the first layer 221 of the third winding portion 220. The first layers 211 and 221 are coplanar and contiguous with each other. In FIG. 13, the boundary between the first layers 211 and 221 is shown by a dotted line.

The magnetic layer 38 lies on the magnetic layer 37. The first layer 211 is wound around the magnetic layer 41 constituting part of the first connecting portion R2, and a portion of the first layer 211 passes between the magnetic layer 41 and the magnetic layer 38. The first layer 221 is wound around the magnetic layer 38 constituting part of the coupling portion R5. FIG. 13 shows an example in which the first layer 211 is wound approximately two turns around the magnetic layer 41. The first layer 221 is wound approximately two turns around the magnetic layer 38.

The first winding portion 210 has a coil connection 211E provided in the first layer 211. As viewed from above, the first layer 211 is wound in a clockwise direction from the boundary between the first layers 211 and 221 to the coil connection 211E. The third winding portion 220 has a coil connection 221S provided in the first layer 221. The coil connection 221S is electrically connected to the coil connection 10E of the second winding portion 10 via the connecting layers 71, 72 and 73 (see FIG. 4 and FIG. 5). As viewed from above, the first layer 221 is wound in a counterclockwise direction from the coil connection 221S to the boundary between the first layers 211 and 221.

The insulating film 61 isolates the first layers 211 and 221 from the first shield 16A, the first gap layer 19, the magnetic layers 38 and 41 and the nonmagnetic layer 60. The insulating layer 62 is disposed in the space between adjacent turns of each of the first layers 211 and 221. The nonmagnetic layer 63 is disposed around the first layers 211 and 221 and the first shield 16A.

FIG. 14 shows the second layer 212 of the first winding portion 210 and the second layer 222 of the third winding portion 220. The second layers 212 and 222 are coplanar and contiguous with each other. In FIG. 14, the boundary between the second layers 212 and 222 is shown by a dotted line.

The magnetic layer 39 lies on the magnetic layer 38. The second layer 212 is wound around the magnetic layer 43 constituting part of the first connecting portion R2, and a portion of the second layer 212 passes between the magnetic layer 43 and the magnetic layer 39. The second layer 222 is wound around the magnetic layer 39 constituting part of the coupling portion R5. FIG. 14 shows an example in which the second layer 212 is wound approximately two turns around the magnetic layer 43. The second layer 222 is wound approximately two turns around the magnetic layer 39.

The first winding portion 210 has a coil connection 212S provided in the second layer 212. The coil connection 212S is electrically connected to the coil connection 211E. As viewed from above, the second layer 212 is wound in a clockwise direction from the coil connection 212S to the boundary between the second layers 212 and 222. The third winding portion 220 has a coil connection 222E provided in the second layer 222. As viewed from above, the second layer 222 is wound in a counterclockwise direction from the boundary between the second layers 212 and 222 to the coil connection 222E.

The insulating film 64 isolates the second layers 212 and 222 from the first layers 211 and 221, the magnetic layers 39 and 43 and the insulating layer 62. The insulating film 64 has an opening for exposing the coil connection 211E. The coil connection 212S is electrically connected to the coil connection 211E through this opening. The insulating layer 65 is disposed in the space between adjacent turns of each of the second layers 212 and 222. The non-illustrated insulating layer described in the first embodiment section is disposed around the second layers 212 and 222 and the magnetic layer 42.

The coil further has a lead layer 230. The lead layer 230 is located farther from the medium facing surface 80 than is the magnetic layer 44, and lies on the insulating layer 66. The insulating layer 66 has an opening for exposing the coil connection 222E. The lead layer 230 is electrically connected to the coil connection 222E through this opening. FIG. 12 to FIG. 14 show an example in which the second winding portion 10, the first layer 221 of the third winding portion 220, the first layer 211 of the first winding portion 210, the second layer 212 of the first winding portion 210, the second layer 222 of the third winding portion 220, and the lead layer 230 are serially connected in this order. The insulating layer 67 is disposed around the lead layer 230.

In the present embodiment, as shown in FIG. 11 and FIG. 14, the magnetic layer 44 is greater in length in the direction perpendicular to the medium facing surface 80 than in the first embodiment, and the bottom surface of the magnetic layer 44 is in contact with the top surface of the magnetic layer 39.

The coil includes a first portion 210A received in the first coil receiving space S1, in place of the first portion 20A. The first layer 211 of the first winding portion 210 includes a portion 211A received in the first coil receiving space S1. The second layer 212 includes a portion 212A received in the first coil receiving space S1. The first portion 210A is composed of the portion 211A and the portion 212A. In other words, the first portion 210A is part of the first winding portion 210. As shown in FIG. 11, FIG. 13 and FIG. 14, no portion of the coil other than the first portion 210A (the portions 211A and 212A) is present in the region located on the front side in the direction T of travel of the recording medium 90 relative to the second virtual plane P2 and sandwiched between the first virtual plane P1 and the medium facing surface 80.

A magnetic flux corresponding to the magnetic field produced by the first winding portion 210 of the coil passes through the first connecting portion R2 and the main pole 15. Magnetic fluxes corresponding to the magnetic fields produced by the second and third winding portions 10 and 220 of the coil pass through the coupling portion R5, the magnetic layer 44 (the first coil surrounding portion R1), the first connecting portion R2 and the main pole 15. Thus, the main pole 15 allows the magnetic fluxes corresponding to the magnetic fields produced by the first winding portion 210, the second winding portion 10 and the third winding portion 220 to pass. In the present embodiment, the total number of turns of the first winding portion 210, the second winding portion 10 and the third winding portion 220 of the coil is approximately 12, which is greater than the total number of turns of the first winding portion 20 and the second winding portion 10 of the coil of the first embodiment. According to the present embodiment, it is thus possible to increase the magnetomotive force produced by the coil to allow the main pole 15 to produce a write magnetic field of greater magnitude.

As the frequency of write signals is increased in order to provide higher recording density, the magnetic head is required to be improved in the rate of change in the direction of the magnetic flux produced from the end face of the main pole 15. The position of an end of a record bit depends on the position of an end of the end face of the main pole 15 located in the medium facing surface 80, the end being located on the front side in the direction T of travel of the recording medium. To provide higher recording density, it is therefore required to improve the rate of change in the direction of the magnetic flux produced from the end face of the main pole 15 and also the rate of change in the direction of the magnetic flux passing through the first shield 16A. To meet these requirements, it is effective to reduce the length of a magnetic path that passes through the first coil surrounding portion R1 and the first connecting portion R2.

The present embodiment makes it possible to reduce the length of the aforementioned magnetic path by configuring the first winding portion 210 to have a small number of turns. Consequently, it is possible to improve both the rate of change in the direction of the magnetic flux produced from the end face of the main pole 15 and the rate of change in the direction of the magnetic flux passing through the first shield 16A, thereby allowing the enhancement of the recording density.

However, merely configuring the first winding portion 210 to have a small number of turns will result in a reduction in the magnetomotive force provided by the first winding portion 210, and may thus cause the main pole 15 to become unable to produce a write magnetic field of sufficient magnitude. To address this problem, the present embodiment is provided with the second coil surrounding portion R3, the coupling portion R5, the second winding portion 10 and the third winding portion 220 in addition to the first coil surrounding portion R1, the first connecting portion R2 and the first winding portion 210. Consequently, even if the number of turns of the first winding portion 210 is reduced to reduce the length of the aforementioned magnetic path, the magnetomotive forces of the first winding portion 210, the second winding portion 10 and the third winding portion 220 allow the main pole 15 to produce a write magnetic field of sufficient magnitude.

Further, in the present embodiment, the number of turns of each of the second winding portion 10 and the third winding portion 220 can be increased without being restricted by the number of turns of the first winding portion 210. By increasing the number of turns of the second winding portion 10 and that of the third winding portion 220 in this manner, the second winding portion 10 and the third winding portion 220 can provide increased magnetomotive forces.

In the present embodiment, in particular, the coupling portion R5 is located farther from the medium facing surface 80 than is the first connecting portion R2. This makes it possible to easily increase the number of turns of each of the second and third winding portions 10 and 220 wound around the coupling portion R5.

Further, in the present embodiment, the second winding portion 10 is located on the rear side in the direction T of travel of the recording medium relative to the main pole 15. This makes it possible to place the second winding portion 10 without restriction by the location of the first winding portion 210. Consequently, it is possible to easily increase the number of turns of the second winding portion 10.

It should be noted that the third winding portion 220 is not an essential component of the magnetic head according to the present embodiment, and can be dispensed with. The remainder of configuration, function and effects of the present embodiment are similar to those of the first embodiment.

Fourth Embodiment

Figure 15:
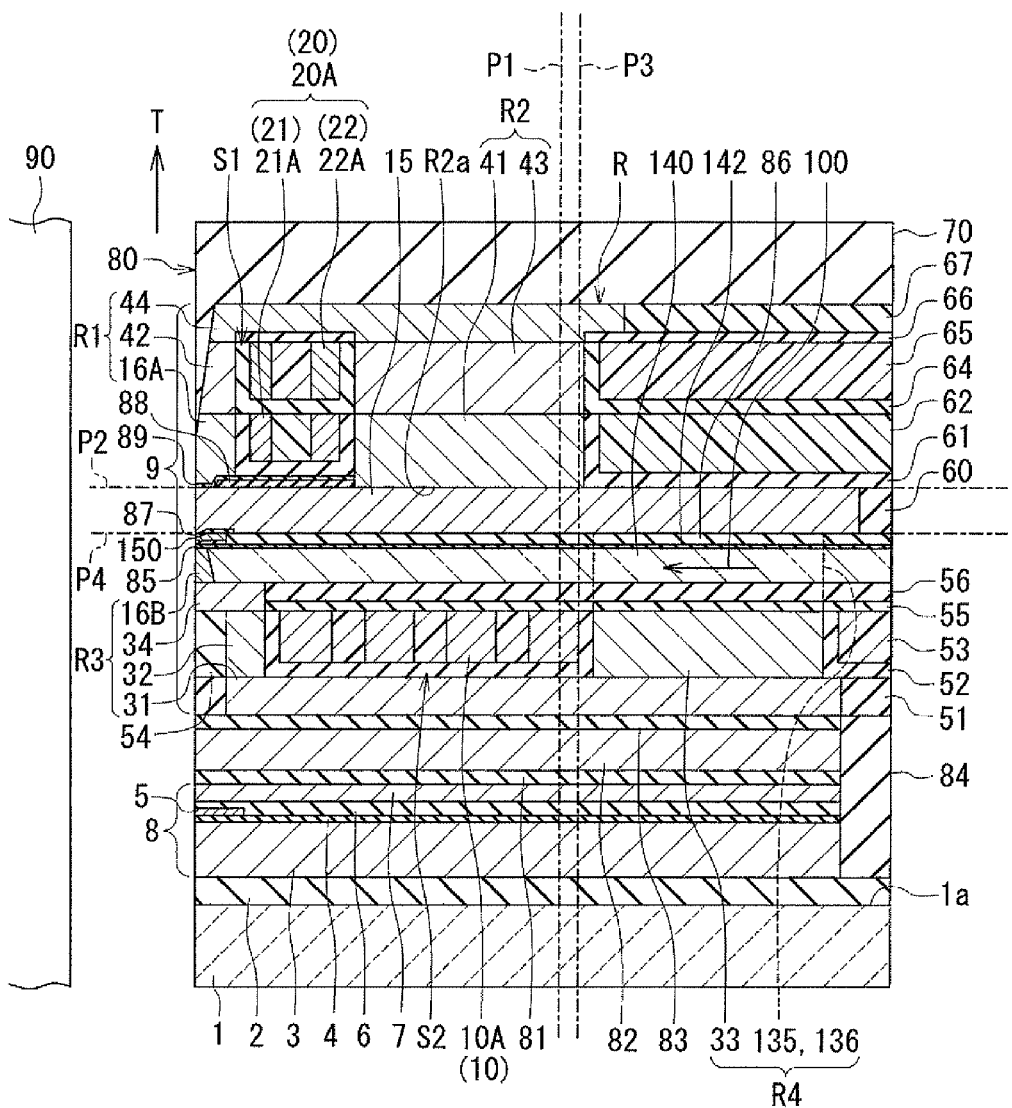
FIG. 15 is a cross-sectional view showing a magnetic head according to a fourth embodiment of the invention.
Figure 16:
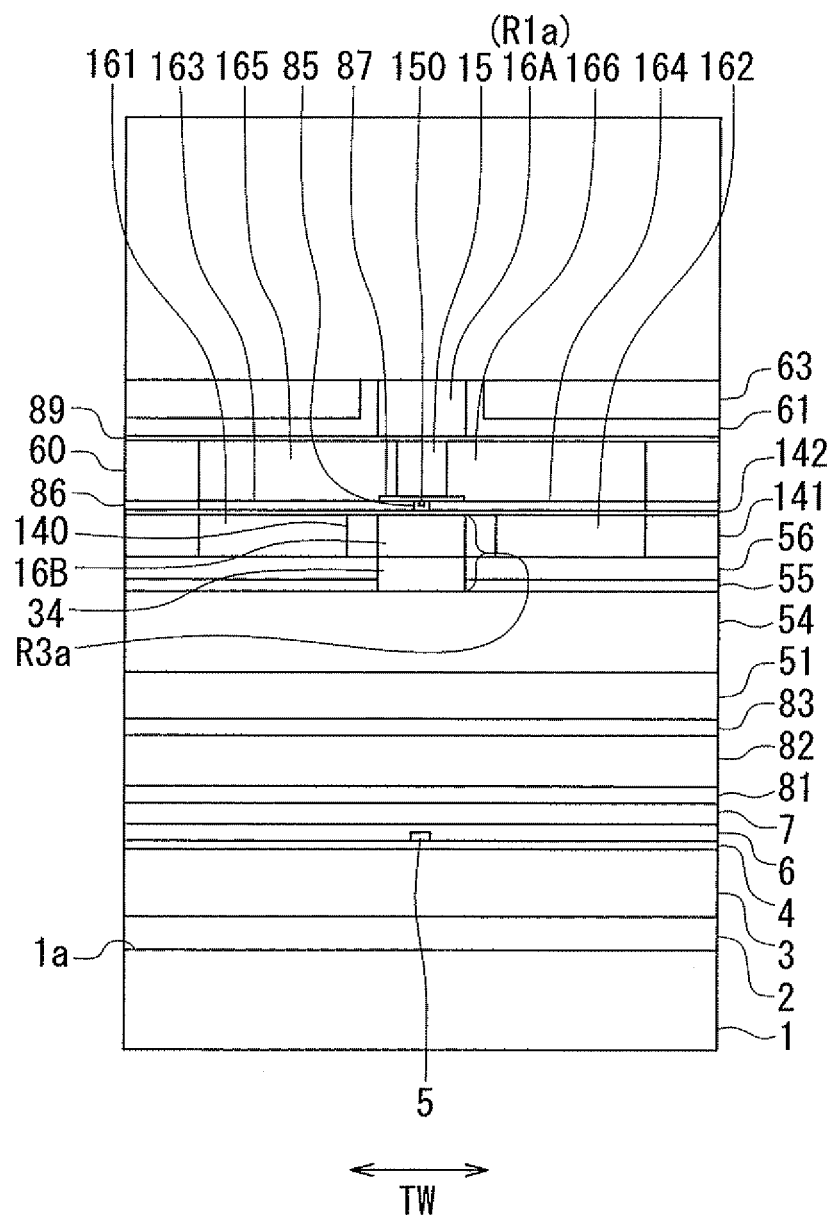
FIG. 16 is a front view showing the medium facing surface of the magnetic head according to the fourth embodiment of the invention.
Figure 17:
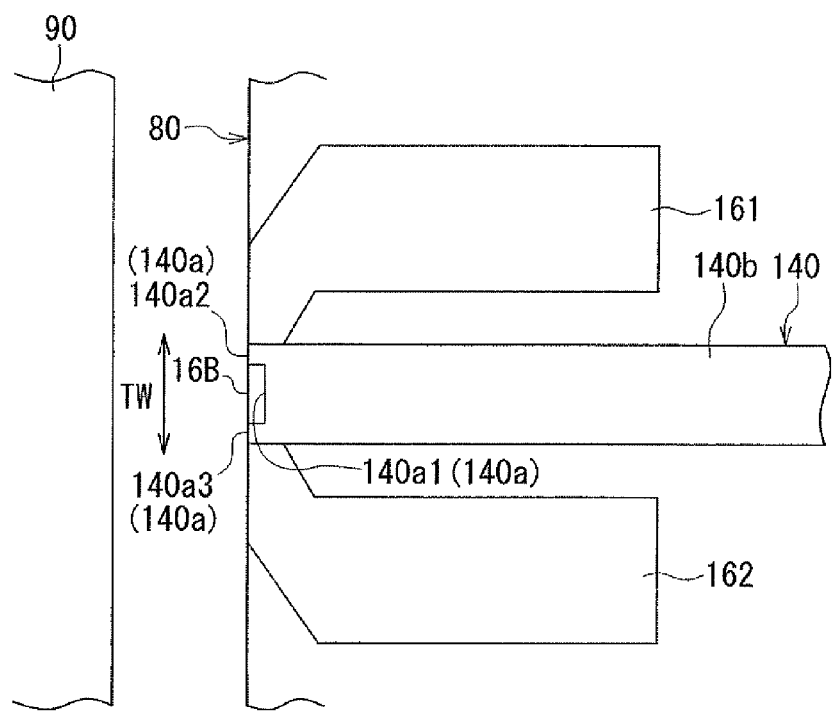
FIG. 17 is a plan view showing a core of a waveguide and its periphery in the magnetic head according to the fourth embodiment of the invention.
Figure 18:
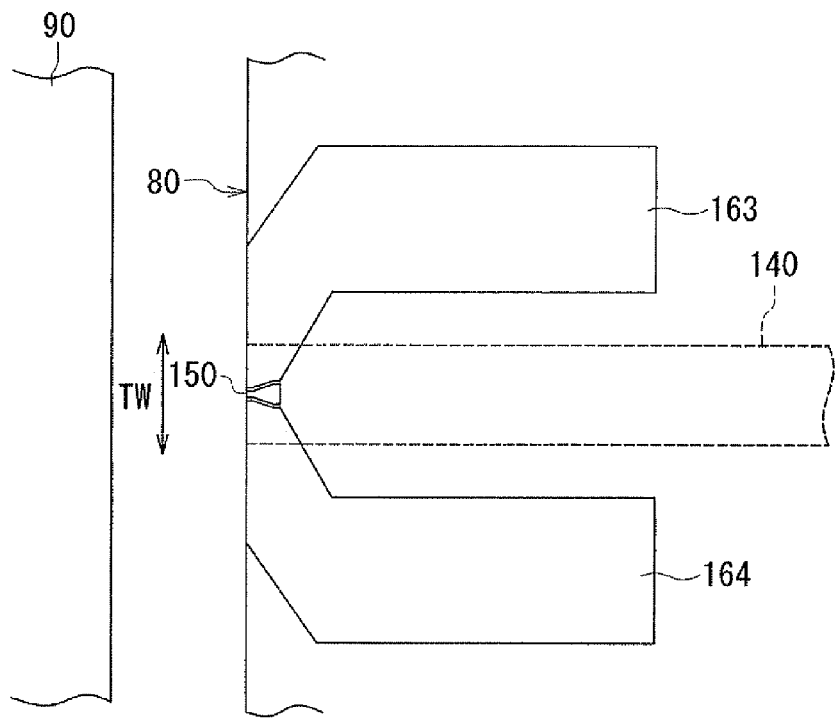
FIG. 18 is a plan view showing a plasmon generator and its periphery in the magnetic head according to the fourth embodiment of the invention.
Figure 19:
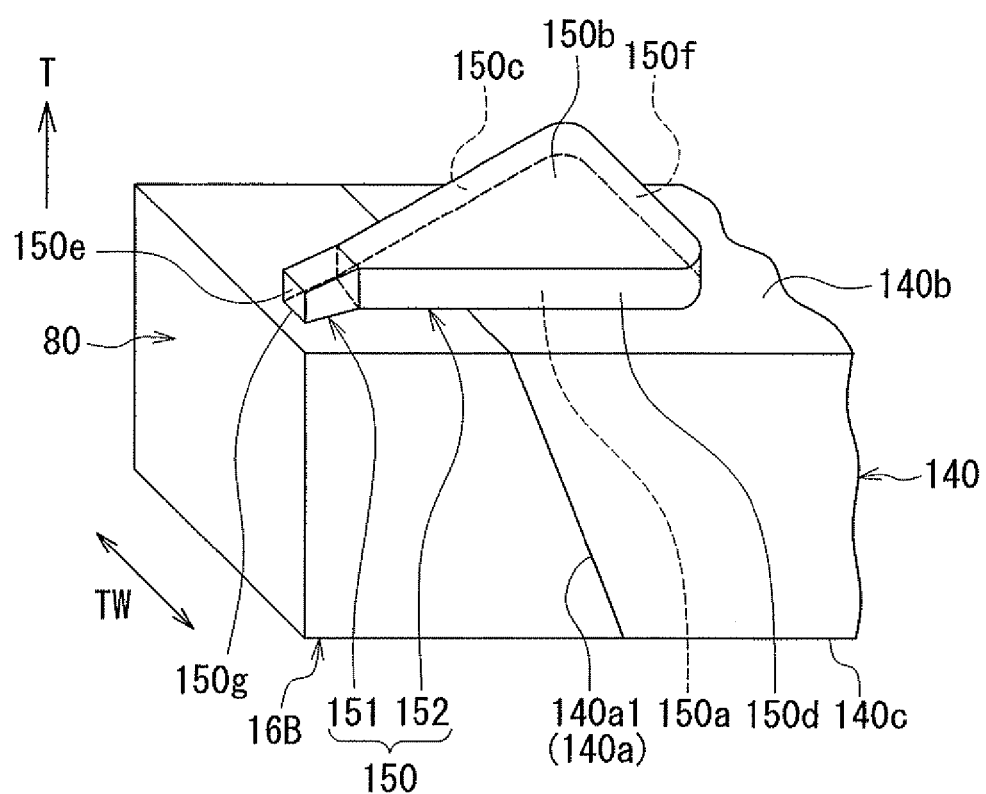
FIG. 19 is a perspective view showing the plasmon generator and its periphery in the magnetic head according to the fourth embodiment of the invention.

A magnetic head according to a fourth embodiment of the invention will now be described with reference to FIG. 15 to FIG. 19. FIG. 15 is a cross-sectional view showing the magnetic head according to the present embodiment. FIG. 16 is a front view showing the medium facing surface of the magnetic head according to the present embodiment. FIG. 17 is a plan view showing a core of a waveguide and its periphery. FIG. 18 is a plan view showing a plasmon generator and its periphery. FIG. 19 is a perspective view showing the plasmon generator and its periphery.

The magnetic head according to the present embodiment is for use in thermally-assisted magnetic recording. Thermally-assisted magnetic recording uses a recording medium having a high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization.

The magnetic head according to the present embodiment is not provided with the side shields 16C and 16D, the first gap layer 19, the second gap layer 18, the nonmagnetic layer 57, the nonmagnetic metal layer 58 and the insulating layer 59. The magnetic head according to the present embodiment includes a waveguide having a core 140 through which light propagates, and a cladding provided around the core 140. The core 140 has an end face 140a closer to the medium facing surface 80, an evanescent light generating surface 140b or a top surface, and a bottom surface 140c. In the present embodiment, the core 140 is disposed such that the second shield 16B is interposed between the core 140 and the medium facing surface 80. The end face 140a of the core 140 includes a first portion 140a1, a second portion 140a2, and a third portion 140a3. The first portion 140a1 is in contact with the second shield 16B. The second and third portions 140a2 and 140a3 are located on opposite sides of the front end face of the second shield 16B in the track width direction TW in the medium facing surface 80. In the present embodiment, the entire rear end face of the second shield 16B is inclined relative to the direction perpendicular to the top surface 1a of the substrate 1. The top surface of the second shield 16B extends in a direction substantially perpendicular to the medium facing surface 80. The second shield 16B does not have the two side portions described in the first embodiment section.

In the present embodiment, the insulating layer 56 is part of the cladding. The cladding further includes cladding layers 141 and 142. The core 140 is disposed on the magnetic layer 34 and the insulating layer 56. The cladding layer 141 is disposed on the insulating layer 56 and surrounds the core 140. The cladding layer 142 is disposed over the top surface of the second shield 16B, the evanescent light generating surface 140b of the core 140 and the top surface of the cladding layer 141.

The core 140 is made of a dielectric material that transmits laser light to be used for generating near-field light. The laser light emitted from a laser diode (not illustrated) enters the core 140 and propagates through the core 140. The cladding layers 141 and 142 and the insulating layer 56 of the present embodiment are each made of a dielectric material that has a refractive index lower than that of the core 140. For example, the core 140 can be made of tantalum oxide such as $Ta_2O_5$ or silicon oxynitride (SiON), while the cladding layers 141 and 142 and the insulating layer 56 can be made of silicon dioxide ($SiO_2$) or alumina.

The magnetic head further includes two nonmagnetic layers 161 and 162 made of a nonmagnetic material, located on opposite sides of the core 140 in the track width direction TW and embedded in the cladding layer 141. In the vicinity of the medium facing surface 80, part of the core 140 is interposed between the second shield 16B and the nonmagnetic layers 161 and 162. As shown in FIG. 17, respective portions of the nonmagnetic layers 161 and 162 apart from the medium facing surface 80 are located on opposite sides of the core 140 in the track width direction TW and at a sufficient distance from the core 140 when viewed from above. The nonmagnetic layers 161 and 162 are made of, for example, alumina, silicon dioxide ($SiO_2$), SiC, or AlN.

The magnetic head further includes: a plasmon generator 150 disposed above the evanescent light generating surface 140b of the core 140 in the vicinity of the medium facing surface 80; two nonmagnetic layers 163 and 164 made of a nonmagnetic material, disposed on the cladding layer 142 and lying on opposite sides of the plasmon generator 150 in the track width direction TW; and an insulating film 85 made of an insulating material and disposed between the plasmon generator 150 and each of the nonmagnetic layers 163 and 164 and the cladding layer 142. As shown in FIG. 18, respective portions of the nonmagnetic layers 163 and 164 apart from the medium facing surface 80 are located on opposite sides of the core 140 in the track width direction TW and at a sufficient distance from the core 140 when viewed from above.

The plasmon generator 150 is configured to excite surface plasmons, as will be described later. For example, the plasmon generator 150 is made of one of Au, Ag, Al, Cu, Pd, Pt, Rh and Ir, or of an alloy composed of two or more of these elements. The insulating film 85 is made of alumina, for example.

The nonmagnetic layers 163 and 164 are made of, for example, alumina, $SiO_2$, SiC, or AlN. FIG. 16 and FIG. 18 illustrate an example in which the nonmagnetic layers 163 and 164 are made of SiC, in particular. Where the nonmagnetic layers 163 and 164 are made of alumina, $SiO_2$ or MN, the insulating film 85 may be omitted. In this case, the nonmagnetic layers 163 and 164 may be in contact with the plasmon generator 150.

The magnetic head further includes a dielectric layer 86 disposed on the cladding layer 142 and surrounding the plasmon generator 150, the nonmagnetic layers 163 and 164 and the insulating film 85. The dielectric layer 86 is made of $SiO_2$, for example.

In the present embodiment, the main pole 15 is disposed such that the plasmon generator 150 is interposed between the main pole 15 and the core 140. The magnetic head further includes a nonmagnetic layer 87 made of a nonmagnetic material and disposed between the plasmon generator 150 and the main pole 15. The material used for the nonmagnetic layer 87 may be alumina or $SiO_2$, for example.

The magnetic head further includes a nonmagnetic layer 165 made of a nonmagnetic material and disposed on the nonmagnetic layer 163, and a nonmagnetic layer 166 made of a nonmagnetic material and disposed on the nonmagnetic layer 164. The two nonmagnetic layers 165 and 166 are located on opposite sides of the main pole 15 in the track width direction TW and in contact with the main pole 15. Although not illustrated, respective portions of the nonmagnetic layers 165 and 166 apart from the medium facing surface 80 are located on opposite sides of the core 140 in the track width direction TW and at a sufficient distance from the core 140 when viewed from above. The nonmagnetic layers 165 and 166 are made of, for example, alumina, $SiO_2$, SiC, or AlN. The nonmagnetic layer 60 is disposed around the main pole 15 and the nonmagnetic layers 165 and 166.

The magnetic head further includes an insulating layer 88 made of an insulating material, and a nonmagnetic layer 89 made of a nonmagnetic material. The insulating layer 88 is located at a distance from the medium facing surface 80 and lies on part of the top surface of the main pole 15. In the present embodiment, the top surface of the main pole 15 extends in a direction substantially perpendicular to the medium facing surface 80. The nonmagnetic layer 89 is disposed to cover the main pole 15, the nonmagnetic layers 165 and 166 and the insulating layer 88. The first shield 16A is disposed on the nonmagnetic layer 89 such that part of the insulating layer 88 is interposed between part of the bottom surface of the first shield 16A and the top surface of the main pole 15. Thus, at a position away from the medium facing surface 80, the distance between the top surface of the main pole 15 and the bottom surface of the first shield 16A is greater than the distance between the end face of the main pole 15 and the front end face of the first shield 16A. The insulating layer 88 is made of alumina, for example. The material used for the nonmagnetic layer 89 may be a nonmagnetic insulating material such as alumina, or a nonmagnetic conductive material such as Ru, NiCu, Ta, W, NiB, or NiP.

Further, in the present embodiment, the second connecting portion R4 of the return path section R includes magnetic layers 135 and 136 in place of the magnetic layers 35 and 36. The magnetic layers 135 and 136 are disposed on the magnetic layer 33 and embedded in the insulating layers 55 and 56, the cladding layers 141 and 142 and the dielectric layer 86. Further, the magnetic layers 135 and 136 are located on opposite sides of the core 140 in the track width direction TW, each being at a distance from the core 140. At a position away from the medium facing surface 80, the bottom end of the main pole 15 is in contact with the top surfaces of the magnetic layers 135 and 136.

An example of the shape of the plasmon generator 150 will now be described with reference to FIG. 19. The plasmon generator 150 has a plasmon exciting part 150a or a bottom surface, a top surface 150b, two side surfaces 150c and 150d, a front end face 150e, and a rear end face 150f. The front end face 150e is located in the medium facing surface 80 and connects the plasmon exciting part 150a, the top surface 150b and the two side surfaces 150c and 150d to each other. The plasmon exciting part 150a faces the evanescent light generating surface 140b of the core 140 with a predetermined distance therebetween. The cladding layer 142 includes an interposition part interposed between the evanescent light generating surface 140b and the plasmon exciting part 150a. For example, the plasmon generator 150 is rectangular in cross section parallel to the medium facing surface 80.

The front end face 150e has a near-field light generating part 150g lying at a front end of the plasmon exciting part 150a. The near-field light generating part 150g is located between the end face of the main pole 15 and the front end face of the second shield 16B. As will be described later, the near-field light generating part 150g generates near-field light.

Further, as shown in FIG. 19, the plasmon generator 150 includes a narrow portion 151 located near the medium facing surface 80 and a wide portion 152 that is located farther from the medium facing surface 80 than is the narrow portion 151. The width of the narrow portion 151 in the track width direction TW may be constant regardless of the distance from the medium facing surface 80, or may decrease toward the medium facing surface 80. The wide portion 152 is located on a side of the narrow portion 151 farther from the front end face 150e, and is connected to the narrow portion 151. The width of the wide portion 152 in the track width direction TW is equal to that of the narrow portion 151 at the boundary between the narrow portion 151 and the wide portion 152, and is greater than that of the narrow portion 151 in the other positions.

The top surface 150b of the plasmon generator 150 includes the top surface of the narrow portion 151 and the top surface of the wide portion 152. The top surface of the narrow portion 151 includes an inclined portion. The distance from the plasmon exciting part 150a to an arbitrary point on the inclined portion decreases with decreasing distance from the arbitrary point to the front end face 150e. The top surface of the narrow portion 151 may include a flat portion that is located closer to or farther from the medium facing surface 80 than is the inclined portion and contiguous with the inclined portion. The flat portion is parallel to the plasmon exciting part 150a.

The width (the dimension in the track width direction TW) of the front end face 150e is defined by the width of the narrow portion 151 in the medium facing surface 80. The width of the front end face 150e falls within the range of 5 to 40 nm, for example. The height (the dimension in a direction parallel to the direction T of travel of the recording medium 90) of the front end face 150e is defined by the height of the narrow portion 151 in the medium facing surface 80. The height of the front end face 150e falls within the range of 5 to 40 nm, for example.

Now, the principle of generation of near-field light in the present embodiment and the principle of thermally-assisted magnetic recording using the near-field light will be described in detail. Laser light emitted from a laser diode (not illustrated) enters the core 140. As shown in FIG. 15, the laser light 100 propagates through the core 140 toward the medium facing surface 80, and reaches the vicinity of the plasmon generator 150. In the core 140, the laser light 100 is totally reflected at the evanescent light generating surface 140b, and evanescent light is thereby generated to permeate into the interposition part of the cladding layer 142. In the plasmon generator 150, surface plasmons are excited on the plasmon exciting part 150a through coupling with the evanescent light. The surface plasmons propagate to the near-field light generating part 150g, and the near-field light generating part 150g generates near-field light based on the surface plasmons.

The near-field light generated by the near-field light generating part 150g is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 15 for data writing.

The remainder of configuration, function and effects of the present embodiment are similar to those of the first embodiment.

The present invention is not limited to the foregoing embodiments, and various modifications may be made thereto. For example, the second coil surrounding portion R3 is not an essential component of the magnetic head of the present invention, and can be dispensed with. Further, for example, the second coil surrounding portion R3 may be replaced with a yoke portion so that a space through which part of the coil passes is defined between the yoke portion and the main pole 15.

Further, as far as the requirements of the appended claims are met, the number of turns of each of the first to third winding portions and the positions of the first to fourth virtual planes P1 to P4 are not limited to the examples illustrated in the foregoing embodiments, and can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:
1. A magnetic head for perpendicular magnetic recording, comprising:
   a medium facing surface configured to face a recording medium;

a coil producing a magnetic field that corresponds to data to be written on the recording medium;

a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system; and a return path section made of a magnetic material, wherein the return path section includes: a first coil surrounding portion located on a front side in a direction of travel of the recording medium relative to the main pole and provided for forming a first coil receiving space; and a first connecting portion located away from the medium facing surface and connecting the main pole and the first coil surrounding portion to each other, the first coil surrounding portion has a first end face located in the medium facing surface and lying on the front side in the direction of travel of the recording medium relative to the end face of the main pole, the first connecting portion has a contact surface in contact with the main pole, the first coil receiving space is a space defined by a first virtual plane, a second virtual plane and the first coil surrounding portion, the first virtual plane intersecting the contact surface and being parallel to the medium facing surface, the second virtual plane including the contact surface and being perpendicular to the direction of travel of the recording medium, the coil includes a first portion received in the first coil receiving space, no portion of the coil other than the first portion is present in a region that is located on the front side in the direction of travel of the recording medium relative to the second virtual plane and sandwiched between the first virtual plane and the medium facing surface, and the first end face has a width in the track width direction that is smaller than a maximum width of the first coil receiving space in the track width direction.

2. The magnetic head for perpendicular magnetic recording according to claim 1, wherein the width of the first end face in the track width direction is in the range of 2 to 10 µm.

3. The magnetic head for perpendicular magnetic recording according to claim 1, wherein
the coil includes a first winding portion wound around the first connecting portion, and
the first portion of the coil is part of the first winding portion.

4. The magnetic head for perpendicular magnetic recording according to claim 1, wherein
the return path section further includes a second coil surrounding portion located on a rear side in the direction of travel of the recording medium relative to the main pole and provided for forming a second coil receiving space,
the second coil surrounding portion has a second end face located in the medium facing surface and lying on the rear side in the direction of travel of the recording medium relative to the end face of the main pole,
the second coil receiving space is a space defined by a third virtual plane, a fourth virtual plane and the second coil surrounding portion, the third virtual plane being parallel to the medium facing surface, the fourth virtual plane being located on the rear side in the direction of travel of the recording medium relative to the main pole and perpendicular to the direction of travel of the recording medium,
the coil further includes a second portion received in the second coil receiving space,
no portion of the coil other than the second portion is present in a region that is located on the rear side in the direction of travel of the recording medium relative to the fourth virtual plane and sandwiched between the third virtual plane and the medium facing surface, and
the second end face has a width in the track width direction that is smaller than a maximum width of the second coil receiving space in the track width direction.

5. The magnetic head for perpendicular magnetic recording according to claim 4, wherein the third virtual plane intersects the contact surface.

6. The magnetic head for perpendicular magnetic recording according to claim 4, wherein the width of each of the first and second end faces in the track width direction is in the range of 2 to 10 µm.

7. The magnetic head for perpendicular magnetic recording according to claim 4, further comprising two side shields each made of a magnetic material, the two side shields having two end faces that are located in the medium facing surface and lie on opposite sides of the end face of the main pole in the track width direction.

8. The magnetic head for perpendicular magnetic recording according to claim 4, wherein the return path section further includes a second connecting portion located away from the medium facing surface and connecting the main pole and the second coil surrounding portion to each other.

9. The magnetic head for perpendicular magnetic recording according to claim 8, wherein
the coil includes a second winding portion wound around the second connecting portion, and
the second portion of the coil is part of the second winding portion.

10. The magnetic head for perpendicular magnetic recording according to claim 4, wherein the return path section further includes a coupling portion located away from the medium facing surface and coupling the first coil surrounding portion and the second coil surrounding portion to each other without being in contact with the main pole.

11. The magnetic head for perpendicular magnetic recording according to claim 10, wherein
the coil includes a second winding portion wound around the coupling portion, and
the second portion of the coil is part of the second winding portion.

* * * * *